June 30, 1936. J. E. PADGETT 2,045,610
AUTOMATIC POWER TRANSMITTING MECHANISM
Filed April 25, 1933 5 Sheets-Sheet 1
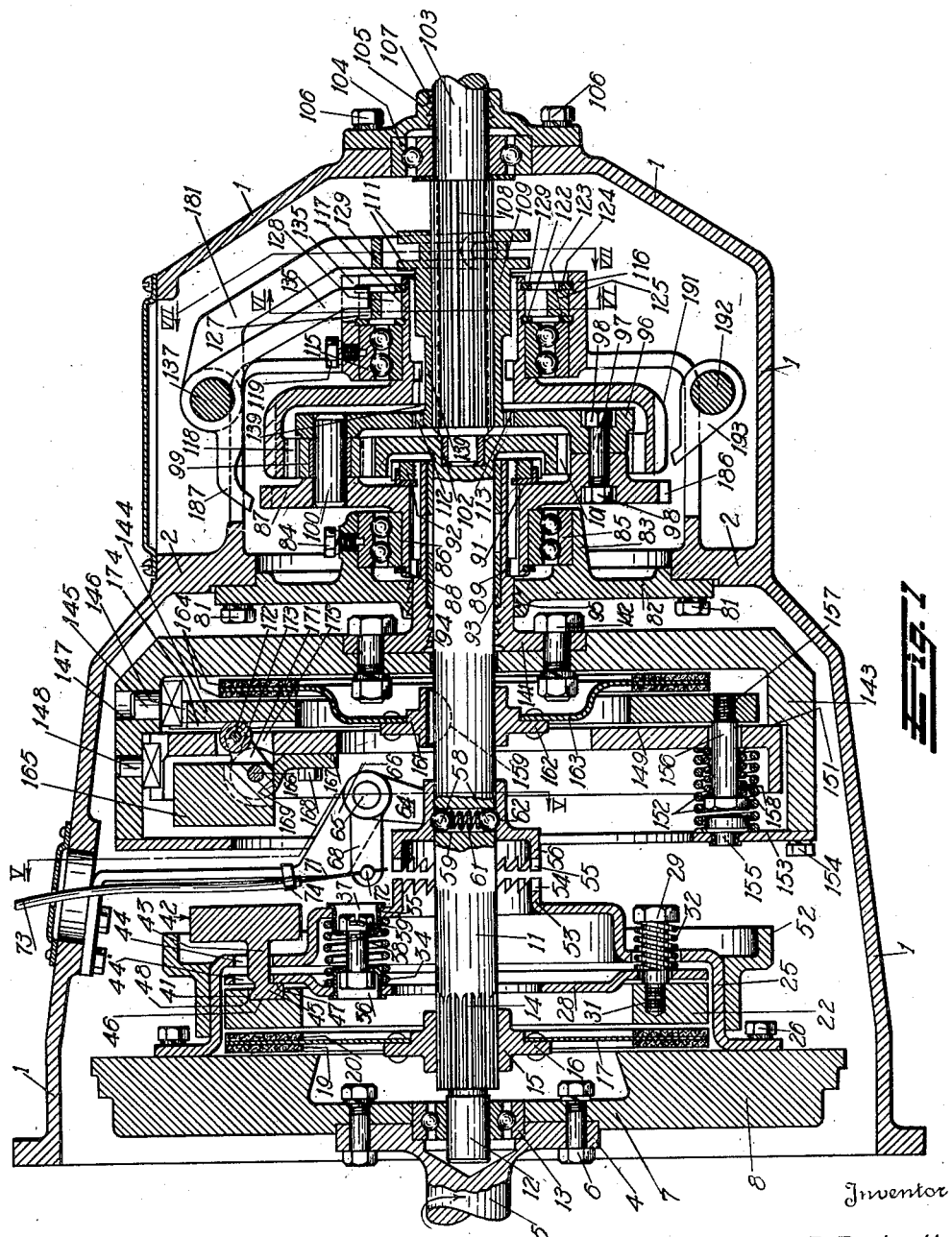
Inventor
Joseph E. Padgett
Strauch + Hoffman
Attorneys

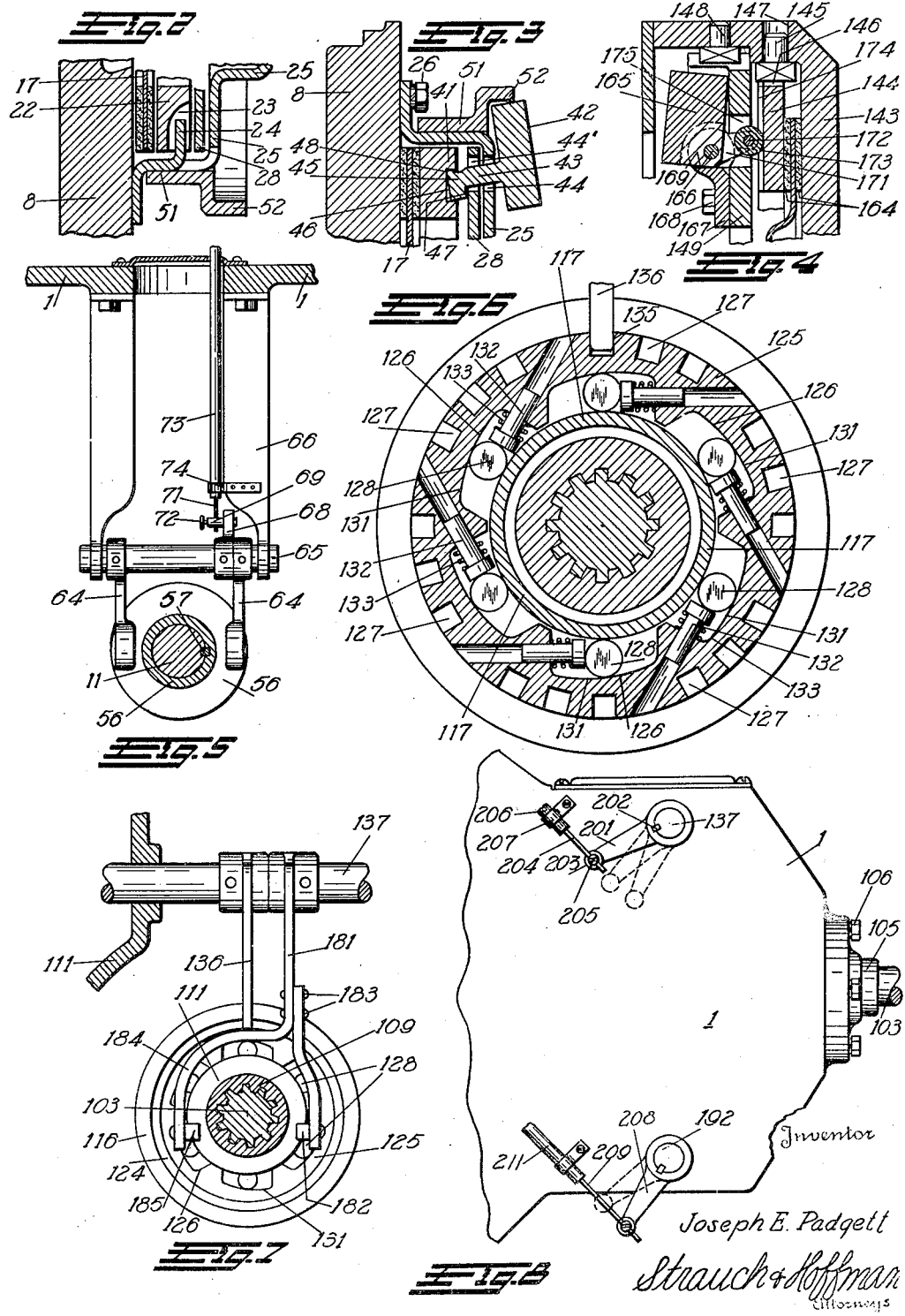

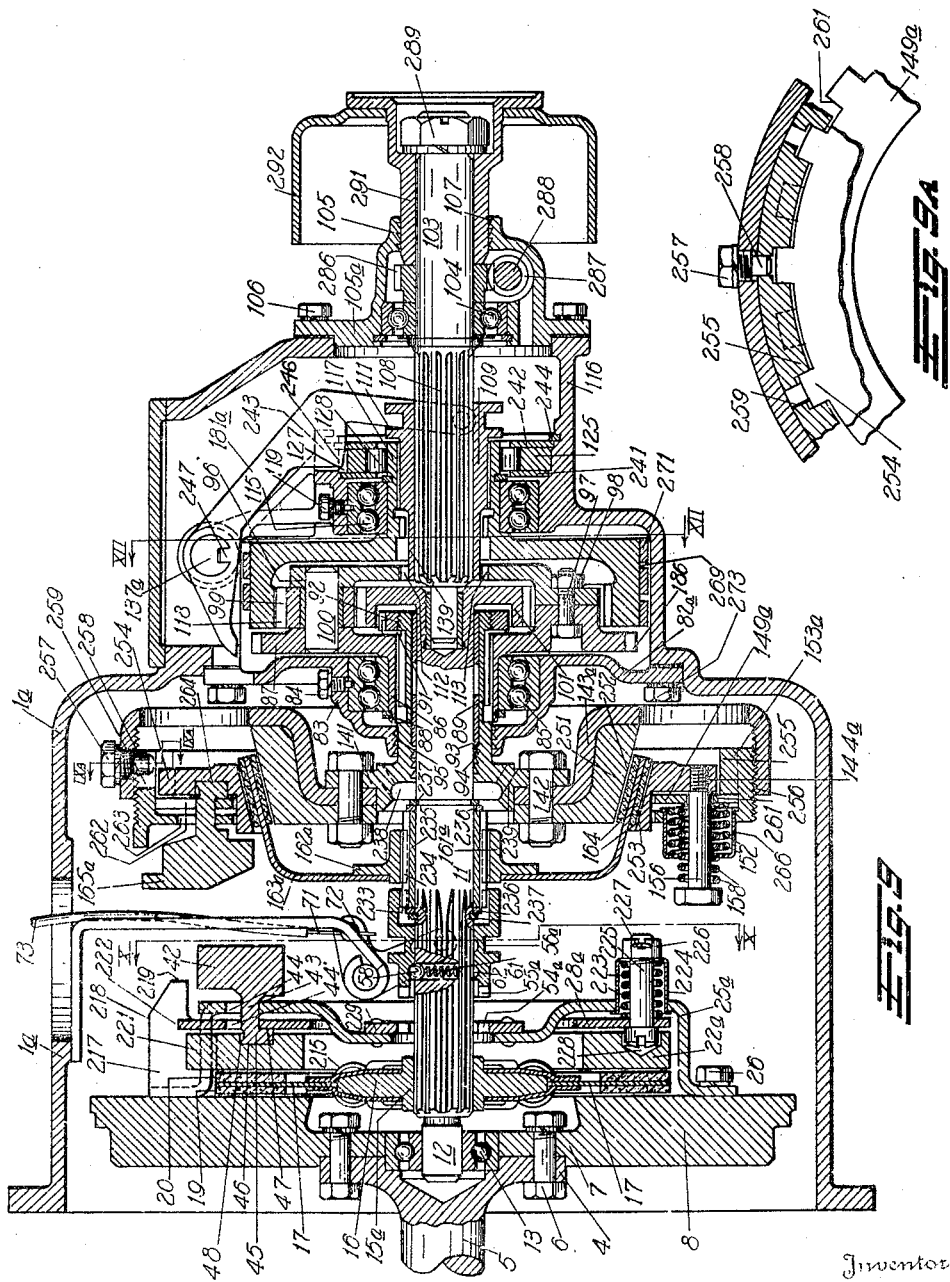

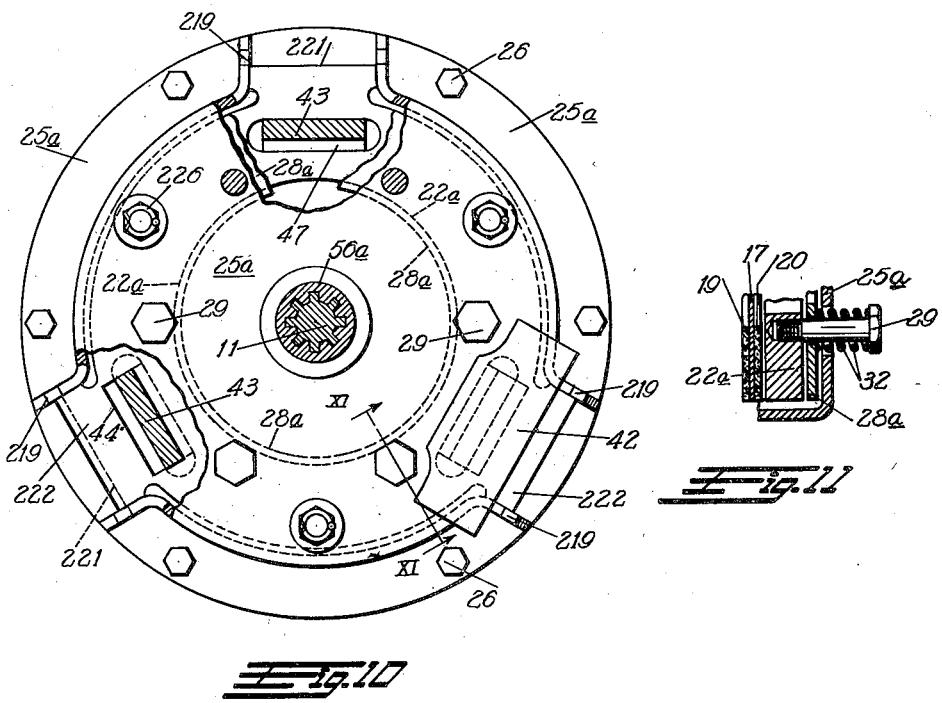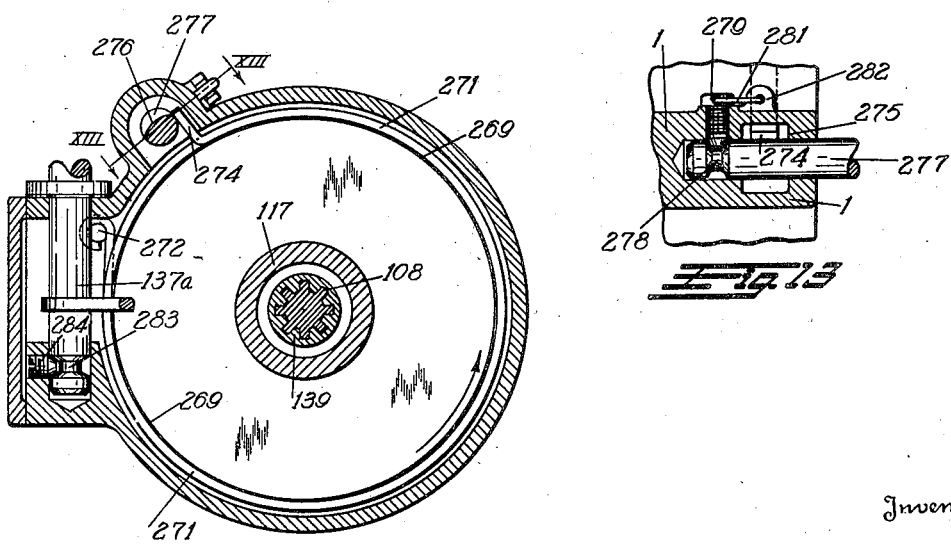

June 30, 1936. J. E. PADGETT 2,045,610
AUTOMATIC POWER TRANSMITTING MECHANISM
Filed April 25, 1933 5 Sheets-Sheet 5
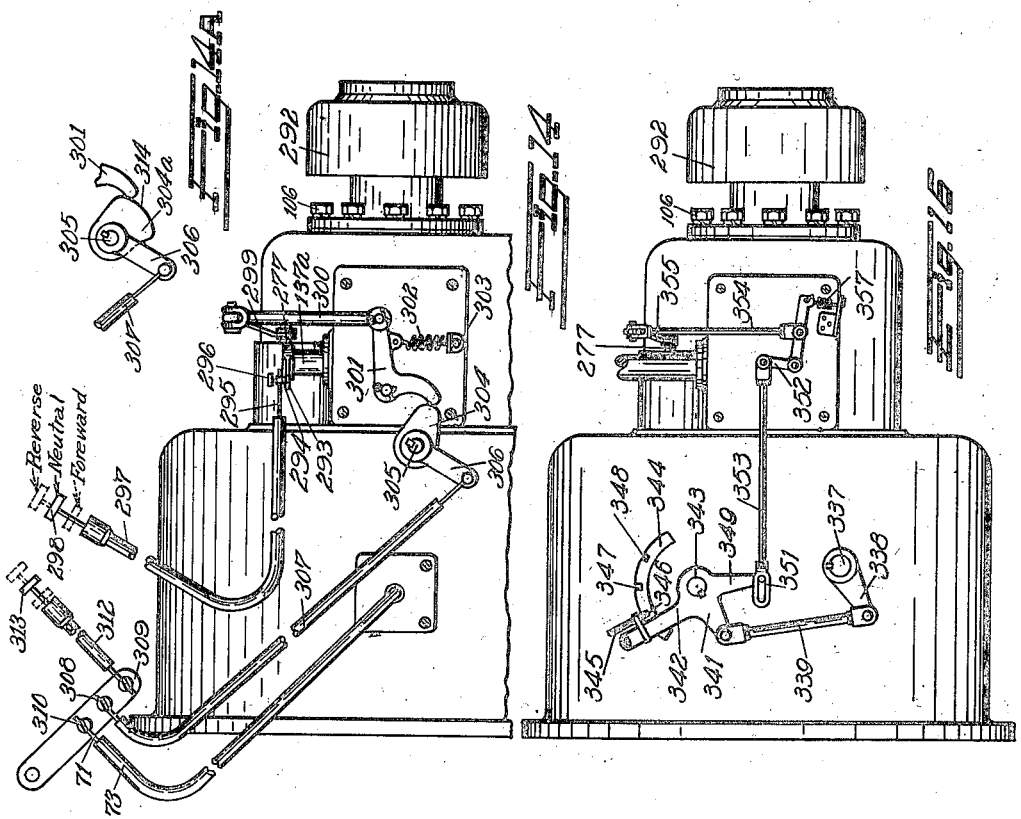
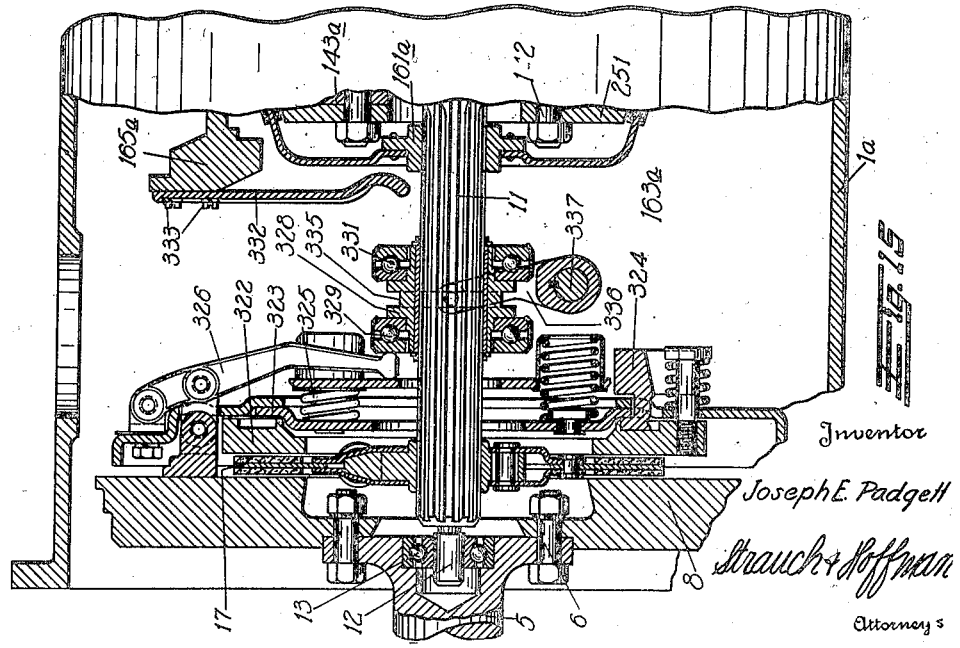
Inventor
Joseph E. Padgett
Strauch + Hoffman
Attorneys Patented June 30, 1936

2,045,610

UNITED STATES PATENT OFFICE 2,045,610

AUTOMATIC POWER TRANSMITTING MECHANISM

Joseph E. Padgett, Toledo, Ohio

Application April 25, 1933, Serial No. 667,869

36 Claims. (Cl. 74—260)

The present invention relates to automatic mechanisms for transmitting power from a driving member to a driven member, adapted for a wide variety of automotive and industrial drives.

More particularly, the present invention relates to automatic power transmitting mechanisms in which power is delivered from the driving to the driven member with sufficient torque amplification at relatively low driven speeds to pick up the load and to accelerate the driven shaft until it is rotating at a speed where the prime mover can drive the load without the aid of torque multiplication, when the driven member is automatically coupled to the driving member.

Various automatic power transmitting mechanisms have heretofore been proposed, but none of such prior automatic transmissions have been commercially feasible because of the complicated mechanisms utilized, their failure to perform all of the functions necessary for practicability, their high cost of production, lack of durability and reasonable life, and excessive size and weight necessary to transmit a reasonable amount of power. While intensive development work has been carried forward, and vast expenditures of time and money have been made in efforts to produce automatic transmissions for automotive, industrial and like uses, that will meet the essential requirements of low cost, reasonable life, and satisfactory operation, such efforts have all heretofore failed.

The prior proposed unsuccessful mechanisms have all been designed to pick up the driven loads with a minimum of slippage, with the result that excessive torque multiplication has been necessary to start the loads with prime movers inherently limited to a comparatively small torque delivery at low operating speeds, such as internal combustion engines, high speed electric motors, steam turbines and like prime movers designed primarily for efficient high speed operation and large power delivery, with comparatively small size and weight. In efforts to provide low cost simple structures, mechanisms with a single ratio of torque multiplication have been proposed but they have failed because of their lack of flexibility and capacity, and because of the inefficient and impractical mechanical design thereof. To avoid these difficulties, multiple torque ratio mechanisms, designed to give flexibility and proper functioning, have been heretofore proposed, but they have failed because of the complexity of the mechanism involved, their comparatively short life in practice, high cost, and inability to deliver the power necessary when constructed in practically usable sizes and weights.

In my co-pending application, Serial Number 643,744, filed November 21, 1932, I have disclosed combined slipping drive and torque multiplying automatic transmission mechanisms wherein the prime mover is permitted to operate at a sufficiently high speed to apply substantial torque, and preferably approximately maximum torque, to the torque multiplying mechanism at all times when the speed of the driven member is below the point where the prime mover can handle the load in direct drive, in combination with mechanism operative to automatically establish direct drive between the driving and driven members when the driven member is operating at a speed sufficient to enable the prime mover to handle the load without torque multiplication. These mechanisms are simple in design, highly efficient in all phases of their operation, low in cost and compact, perform the manifold functions peculiar to automatic or similar drives, and deliver the power required well within the space and size limits allotted to modern automotive transmission mechanisms. Because of the fact that they permit comparatively high speed prime mover operation during starting operations, in addition to being highly useful for automotive drives, they permit the adoption of efficient high speed simplified electrical motors, steam turbines, and the like as prime movers for electrically and steam driven vehicles and industrial drives such as locomotive, elevator, drier, conveyor, crusher and similar drives requiring heavy starting torque, which have been heretofore driven by expensive prime movers in which low cost and efficiency have been necessarily sacrificed to secure large starting torque at very low starting speeds.

The present invention provides automatic power transmitting mechanisms having the highly desirable operating characteristics of those disclosed in my copending application above referred to, and further highly desirable characteristics to be hereinafter pointed out, but are constructed in a somewhat different manner. The present application accordingly is a continuation in part of my above mentioned copending application.

It is a primary object of the present invention to provide compact and light, but durable and highly efficient improved automatic power transmitting mechanisms.

Another major object of the present invention is to provide novel automatic power transmitting mechanisms, which will transmit power from the prime mover to the load through a torque multiplying mechanism when the load handled by the mechanism is being started or is operating at relatively low speeds; which will automatically establish a direct drive between the prime mover and the load when the speed of the prime mover is such that it can adequately handle the load without the aid of torque multiplication, and which may be operated to establish a reverse drive between the prime mover and the load through the torque multiplying mechanism.

Another object of the present invention is to provide power transmitting mechanisms which will automatically and smoothly transmit power from the prime mover to the load through a slipping, torque multiplying coupling when the load is being started or is operating at a relatively low speed; which will directly couple the prime mover with the load when the speed attained by the load is such that the prime mover does not need torque multiplication to adequately handle it; and which may be manually operated to prevent the transition from indirect torque multiplying drive to direct drive from being automatically effected.

Another important object of my invention is to provide automatic power transmitting mechanisms of the character mentioned with means for establishing a reverse drive between the prime mover and the load and to simultaneously render the mechanism inoperative to automatically directly couple the prime mover and load.

The present invention further aims to provide novel power transmitting mechanisms which will automatically establish a torque multiplying connection between the prime mover and the load when the load is being started or is operating at relatively low speeds; which will directly couple the prime mover and the load when the load has attained a speed sufficiently high that the prime mover can adequately handle it without torque multiplication; and which may be operated to permanently establish a torque multiplying connection between the prime mover and the load for preventing the prime mover and the load from being automatically directly coupled.

A further object of the present invention is to provide automatic power transmitting mechanisms which will automatically transmit power from the prime mover to the load through a torque multiplying mechanism when the load handled by the mechanism is being started or is operating at relatively low speeds; which will automatically directly couple the prime mover and the load when the prime mover can handle the load without torque multiplication; and which has mechanism associated with the torque multiplying mechanism for disconnecting the prime mover and load.

Another object of the present invention is to provide automatic power transmitting mechanisms of the character mentioned with a torque multiplying mechanism which is normally inoperative to transmit driving efforts to the prime mover when the load is tending to drive the prime mover but which may be controlled to cause the torque multiplying mechanism to become operative to transmit power from the load to prime mover, whereby, in an automotive vehicle, the braking effort of the engine may be employed to control coasting tendencies of the vehicle.

My invention further aims to provide power transmitting mechanisms, of the type wherein the prime mover and load are normally automatically disconnected when the prime mover is operating substantially below the speed of efficient torque delivery, with means for transmitting torque from the load to the prime mover under such conditions.

It is a further object of the present invention to provide automatic power transmitting mechanisms which will automatically disconnect the prime mover from the load when the prime mover is operating substantially below the speed of efficient torque delivery; which will automatically transmit power from the prime mover to the load through a torque multiplying mechanism when the prime mover attains a predetermined speed; which will automatically directly couple the prime mover and the load when the respective speeds of the prime mover and the load are so correlated that the prime mover can adequately handle the load without torque multiplication; and which may be controlled to establish a coupling for transmitting driving efforts from the load to the prime mover during any phase of transmission operation.

A further object of the present invention is to provide power transmitting mechanisms of the character wherein the prime mover and load are normally automatically disconnected when the prime mover is operating below the speed of efficient torque delivery, with means for transmitting torque from the load to the prime mover during any phase of transmission operation and which will automatically become ineffective when the prime mover tends to transmit torque to the load.

It is another object of the present invention to provide a novel torque multiplying mechanism having torque multiplying elements that are normally operable to transmit rotative efforts from the prime mover to the load, and which may be operated to transmit retrograde rotative efforts from the prime mover to the load.

It is a further aim of the present invention to provide novel torque multiplying mechanisms having torque multiplying elements which are normally operable to transmit rotative efforts from the prime mover to the load; which may be operated to disconnect the prime mover and the load, and also operated to transmit retrograde rotative efforts from the prime mover to the load.

A still further object of my invention is to provide automatic power transmitting mechanisms of the type wherein the transition from indirect to direct drive is automatically effected, with novel simplified automatic clutch mechanisms for effecting the transition from indirect to direct drive with the proper degree of rapidity to produce smoothly operating and thoroughly practical transmission units for automotive or similar drives.

My invention further provides power transmitting mechanisms of the character mentioned utilizing a plurality of automatic clutches, so designed that all of the clutch mechanisms incorporated therein may be completely isolated from the torque multiplying mechanisms and bearings so that the clutch mechanisms utilized may be of the dry or self-lubricated type, thus avoiding uncontrollable modification of the operating characteristics thereof through exposure to gear and bearing lubricants.

A still further object of my invention is to provide novel automatic clutch mechanisms that are rugged, simple in design, and highly efficient and which are especially effective in automatic power transmitting mechanisms of the character mentioned, although they are not limited to such use.

It is another object of my invention to provide automatic power transmitting mechanisms of the type wherein a plurality of automatic clutch mechanisms operate in sequence to establish a torque multiplying coupling and then a direct coupling between the prime mover and the load, with means for manually declutching any of the automatic clutch mechanisms during any phase of operation.

Further objects of my invention will become apparent as the description thereof proceeds in connection with the annexed drawings and as pointed out in the annexed claims.

In the drawings:

Figure 1 is a longitudinal sectional view of one form of automatic power transmitting mechanism embodying my invention.

Figure 2 is a fragmental sectional view of the primary clutch illustrated in Figure 1.

Figure 3 is a fragmental sectional view of the primary clutch mechanism of Figure 1, illustrating the parts in the positions they assume when the clutch is engaged.

Figure 4 is a fragmental sectional view of the secondary clutch illustrated in Figure 1 with the parts disposed in engaged condition.

Figure 5 is a sectional view taken substantially on line V—V of Figure 1, looking in the direction of the arrows.

Figure 6 is a sectional view taken on the line VI—VI of Figure 1.

Figure 7 is a sectional view taken substantially on the line VII—VII of Figure 1, illustrating the parts as they appear when viewed in the direction of the arrows.

Figure 8 is an elevational view on a reduced scale of the mechanism illustrated in Figure 1, showing the mechanism for controlling the operation of the cross-shafts.

Figure 9 is a longitudinal sectional view of another form of automatic power transmitting mechanism embodying my invention.

Figure 9A is a fragmental sectional view taken substantially on the line IXa—IXa of Figure 9.

Figure 10 is a sectional view taken substantially upon the line X—X of Figure 9, with parts broken away to more clearly illustrate the structure involved.

Figure 11 is a fragmental sectional view of the primary clutch mechanism illustrated in Figure 9, disclosing further details of the construction.

Figure 12 is a sectional view taken approximately on the line XII—XII of Figure 9, looking in the direction of the arrows.

Figure 13 is a sectional view taken on line XIII—XIII of Figure 12.

Figure 14 is an elevational view illustrating the control mechanism for the device illustrated in Figure 9.

Figure 14A is a fragmental view illustrating the device shown in Figure 14 as it appears when provided with a different type of cam.

Figure 15 is a longitudinal sectional view illustrating a further modification of my invention, and Figure 16 is an elevational view of the mechanism disclosed in Figure 15.

Referring to the drawings, wherein like reference characters designate like parts throughout the several views, in Figure 1 a housing 1 is shown, which may be connected to a prime mover and in which the mechanism is enclosed. Housing 1 is provided, approximately centrally of the length, with an inwardly extending annular flange 2.

Secured to flange 4 of engine or driving shaft 5, by means of bolts 6 or the like, in well known manner, is web portion 7 of flywheel 8. Disposed in axial alignment with driving shaft 5, and mounted for rotation, is driven shaft 11, which will be hereinafter termed the intermediate shaft and which is reduced at 12 and journaled in a suitable antifriction pilot bearing assembly 13, mounted in web 7 of flywheel 8 and in a bore in the end of shaft 5 in well known manner.

Primary clutch mechanism

Intermediate shaft 11 has the other end thereof operably connected to a novel automatic transmission for amplifying the torque applied to the final driven member in a manner to be presently described. Shaft 11 has a splined portion 14 upon which a correspondingly splined hub 15 is slidably mounted. Hub 15 is provided with a flange 16 to which is secured, by means of rivets or the like, a driven disc 17. While I have disclosed disc 17 as being rigidly secured to flange 16 of hub 15, it is to be understood that if it is desired a suitable resilient coupling, of any well known construction, may be interposed between these two members for the purpose of dampening out torsional vibrations set up in the crank shaft of the engine.

Each face of disc 17, near its periphery is provided with a facing 19 and 20 respectively, which may consist of any material that has the required characteristics to give the correct frictional gripping force, and at the same time has wearing qualities adapting it for this purpose. I prefer, however, to use the types of material which in practice have given very satisfactory results in an automatic slipping drive and clutch mechanism of the "Powerflo" type. Frictional facings 19 and 20 may be secured to disc 17 in any suitable manner as for instance by rivets or the like.

Facing 19, secured to disc 17, cooperates with the flat face of flywheel 8 and is adapted to be engaged and frictionally driven thereby. Facing 20, provided on disc 17, cooperates with a plate 22 which will be hereinafter termed the automatic plate for the reason that it is automatically actuated and is adapted to engage and clamp driven member 17 between it and the flat face of the flywheel. Disc 17, along with hub 15 and facings 19 and 20, constitutes the driven member, and this entire driven assembly will be hereinafter termed driven member 17 for sake of brevity. Plate 22 is of substantial thickness so that it may possess a sufficient degree of rigidity to prevent distortion and warpage thereof during operating conditions.

Plate 22 is driven with flywheel 8, and is permitted to move axially thereof for clutching and declutching purposes, by means of radial recesses 23 formed therein, which are disposed at preferably 120° intervals around the periphery of plate 22, each of which cooperates with a curved finger 24 formed on and projecting inwardly from cover member 25, which preferably takes the form of a plate having offset disc-like and cylindrical portions and is secured to the face of the flywheel by means of cap screws 26 or the like.

Disposed parallel to automatic plate 22, and also mounted for rotation with flywheel 8, is a plate 28 which will hereinafter be termed the reaction plate because it takes the reaction of the automatic weights in a manner presently to be described. Referring more particularly to Figures 1 and 2 of the drawings, automatic plate 22 and reaction plate 28 are urged toward each other by means of hold-back bolts 29 that are threaded into automatic plate 22 at 31, and slidably fit in apertures in reaction plate 28. Bolts 29 are encircled by compression springs 32 which seat at one end directly against reaction plate 28, and at the other end react against the heads of bolts 29. Bolts 29 are preferably three in number, and are spaced at approximately 120° intervals about the periphery of plates 22 and 28. Automatic plate 22 is keyed to rotate with flywheel 8, and bolts 29 therefore function to cause the reaction plate 28 to rotate with, or be driven by automatic plate 22 and flywheel 8. It is to be understood however that if desired, I may employ additional means for keying the reaction plate directly to plate 22 or flywheel 8, without departing from the spirit of the present invention.

Reaction plate 28 is normally urged toward the flywheel by means of a plurality of compression springs 34 interposed between plate 28 and inner wall of disc portion 35 formed on cover plate 25. The ends of springs 34 are centered and held in position in the mechanism by means of flanged sheet metal cups 36 and 37 located in apertures in the automatic and reaction plates respectively. Cups 36 and 37 are apertured and slidably receive bolts 38 having nuts 39 threaded thereon. The bolt and nut assemblies cooperate with cup members 36 and 37 to limit movement of reaction plate 28 away from cover plate 25 under the influence of springs 34, and in Figure 1, plate 28 is shown in its limit of movement away from cover plate 25. Nuts 39 are adjusted at the factory to bring automatic plate 22 into parallelism with the flywheel and with the proper idling clearance between it and the driven member for automatic idling condition. Nuts 39 may be subsequently adjusted to dispose the automatic plate closer to the flywheel when facings 19 and 20 have worn thin as the result of wear in operation.

The preferred automatic speed responsive or centrifugal operating mechanism will now be described. The rear face of automatic plate 22 is provided with a plurality of elongated bearing recesses 41 which are preferably rectangular in cross-section, and which provide flat bottom faces against which the automatic or centrifugal weights fulcrum and react to cause clutch engagement. Centrifugal weights, designated generically by reference character 42, are preferably three in number, and are symmetrically disposed between the hold-back assemblies. Each centrifugal weight is preferably segmental in shape to render the mechanism compact and consists of a lever section 43, which is of substantial width and is received in aligned rectangular apertures 44 and 44' formed in cover plate 25 and reaction plate 28 respectively. Levers 43 carry at their extremities heads 45, which seat in recesses 41 and each of which is provided with a flat face 46 that normally abuts the bottom face of its respective recess 41 in automatic plate 22 when the engine or prime mover is operating at idling speed or is stationary. Heads 45 are also provided with a reaction face 47 which normally abuts the face of reaction plate 28 and is designed for fulcruming engagement therewith during operation of the weights. Heads 45 have their outer sides relieved to provide knife-like edges 48 which are adapted to rotate or pivot in the angular seats defined by the bottom faces and outer walls of recesses 41 formed in automatic plate 22. The relieving operation enables a good knife edge to be formed on each weight head 45, and allows pivotal movement thereof without interference from the outer side walls of recesses 41. However, unrelieved weights may be employed in recesses that are suitably designed, so as to have relieved outer side walls. When plates 22 and 28 are separated, heads 45 of weights 42 may be lifted out of recesses 41, and the weights removed from the mechanism. This is a desirable feature because the weights can be integrally formed and readily incorporated in the mechanism after they have been completely machined, thus cutting down production costs. Knife edges 48 are adapted to cooperate with the flat bottom faces of recesses 41 and thereby act in line contact upon plate 22 for a substantial distance across the face thereof, whereby uniform distribution of pressure around substantially the entire area of the automatic plate is effected.

The mass of weights 42, and the number employed in a particular installation is determined by a consideration of the combined pressure that they must transmit for proper operation of the clutch mechanism. In the automatic drive and clutch mechanism shown, three equally spaced weight assemblies are employed.

When shaft 5 is stationary, or operating substantially at a speed corresponding to the idling speed of the prime mover employed to drive it, the parts assume the positions in which they are shown in Figure 1. Heads 45 of weights 42 are clamped between plates 22 and 28 under the influence of springs 32, and plate 28 is held in the position shown by bolts 38, under the influence of springs 34. As the speed of the flywheel increases, each weight 42 gradually swings outwardly about the edge 48 as a pivot in response to centrifugal force. As this occurs, reaction faces 47 of heads 45 abut and slide on the face of reaction plate 28, and knife edges 48, by virtue of their engagement and fulcruming action upon the flat bottom surface of recesses 41 in automatic plate 22, force automatic plate 22 into engagement with facing 20 of disc 17, thus causing disc 17 to move axially and bring the face 19 thereof into contact with the flywheel face. As this occurs, faces 47 of heads 45 force reaction plate 28 away from the flywheel against the action of springs 34. Accordingly, as weights 42 swing outwardly and bring the driving and driven members into clutching engagement, reaction plate 28 is forced away from the flywheel, and due to the resilient nature of the backing means therefor, should certain weights 42 swing further outwardly than the remaining weights, the pressure exerted thereby will nevertheless be uniformly distributed about the periphery of plate 22 for the reason that reaction plate 28 can tilt or float and take a slight angular position with respect to automatic plate 22, due to the fact that its sole movement-limiting means is constituted by springs 34.

If reaction plate 28 were not allowed to rock in the manner just described, the reaction thereof against outward movement of weights 42 would be unequal, and if the outward movement of certain weights were greater than that of the remaining weights, the resulting action of these weights would cause a greater force to be exerted upon automatic plate 22 in the regions against which they act, and therefore automatic plate 22 might be distorted as a result of such non-uniform application of force thereto and clutch engagement would not be as smooth as with the mechanism illustrated.

Referring to Figure 3 of the drawings, the centrifugal weight there disclosed is shown in its outermost position, and automatic plate 22 and reaction plate 28 are shown in their separated positions, at which time driven member 17, carrying faces 19 and 20, is clamped securely between automatic plate 22 and flywheel 8 in non-slipping engagement. To definitely limit the swinging movement of each weight assembly in its outward direction an annular member 51 is secured to the cylindrical portion of cover member 25 and provides a flange 52 with which weights 42 are adapted to engage, thereby providing a definite stop for each centrifugal weight assembly so that at extremely high speeds excessive pressure between automatic plate 22 and the driven member cannot occur, and also performs the function of definitely stopping all of the weights in a common plane normal to the axis of the mechanism, so that at high speeds dynamic balance of the entire mechanism is secured, and vibration thereof avoided. It is preferable to construct member 51 in the form of an annular member to provide a re-enforcement or stiffening element for plate 25, but it is to be understood, that if desired, individual stops may be provided for weights 42.

The parts of the clutch mechanism illustrated in Figure 1 are shown in the positions they assume when the engine or prime mover is idling or stationary. As the prime mover accelerates, centrifugal weights 42 gradually swing outwardly and cause automatic plate 22 to move toward and force driven member 17 against the flywheel in the manner previously described. Movement of automatic plate 22 away from reaction plate 28 is opposed by holdback springs 32, and therefore weights 42 are held under control and do not "flutter" or vibrate. Holdback springs 32 therefore, in addition to predetermining the speed of the mechanism at which clutch operation is initiated, exert a steadying influence upon the mechanism. As weights 42 swing further outwardly they react against plate 28 and cause pressure to be gradually built up in springs 34 and this gradual build up of pressure in springs 34 causes a torque of gradually increasing magnitude to be transmitted to driven shaft 11. Rotation of intermediate shaft 11 is thus initiated without shock. When the prime mover attains sufficient speed, weights 42 swing to their furthermost limits in contact with flange 52 and the driving and clutch plates will be in firm driving engagement with no slippage between them. A smooth automatic drive with a slipping pick-up that permits the prime mover to operate at efficient torque delivery speeds at all times is thus established from the prime mover to intermediate shaft 11.

Holdback springs 32 and pressure springs 34 are preferably so designed, that when they are compressed by the action of weights 42 a slipping torque transmitting connection will be established between the driving and driven members, for a period as great as or greater than approximately 100% to 125% of the initial engaging speed of the driving member. For instance, if in the particular automatic clutch illustrated, the primary clutch commences to engage and transmit torque when the speed of the driving member is, for example, 500 revolutions per minute, and engagement may be completed with sufficient pressure so that no slippage will exist between the driving and driven members when the driving member attains a speed of approximately 1000 or more revolutions per minute. The automatic clutch, in establishing a slipping drive between the prime mover and load, over a substantial speed range, permits the prime mover to operate at a higher point on its speed-torque curve and therefore to develop more torque than if the conditions of substantially no slippage between the prime mover and load existed.

In the particular clutch illustrated, holdback springs 32 may be so designed that they urge automatic plate 22 and reaction plate 28 together with a total force of approximately 400 pounds, and pressure springs 34 are designed that they oppose the reaction of reaction plate 28 with a total force of approximately 1,200 pounds when the plates are fully engaged and weights 42 are in their outermost positions against flange 52. Therefore, weights 42 must exert a certain force to initiate clutch engagement, and approximately four times this force to complete the engagement, when they are exerting their full pressure. Accordingly, in view of the fact that in centrifugal mechanism of this character, the available forces vary as the square of the speed, the speed of the driving member at the completion of clutch engagement, will be double the speed at which clutch engagement is initiated, and a wide range of slipping drive is provided, permitting the prime mover to operate at sufficient speed to develop substantial torque at the point of complete non-slipping clutch engagement.

Although this clutch mechanism is solely dependent for its operation upon the speed of driving shaft 5, it is to be understood, that if desired, a manually operable declutching mechanism may be associated with reaction plate 28 for moving it and plate 22 away from the driven member to disengage plate 22 from driven member 17, thereby disconnecting shafts 5 and 11 during any phase of operation of the centrifugal mechanism in a manner similar to that disclosed in my above-mentioned co-pending application.

In view of the fact that the present mechanism automatically disconnects shafts 5 and 11, when shaft 5 is stationary or rotating at a speed corresponding to the idling speed of the prime mover employed to drive it, and it is sometimes desirable to effect a driving connection to allow torque to be transmitted from the driven shaft to the driving shaft under those conditions, cover member 25 is provided with a cylindrical hub portion 53, in which a plurality of inclined teeth or jaws 54 are formed. Teeth 54 are adapted to cooperate with oppositely inclined teeth 55 formed on a sliding clutch member 56. Member 56 is mounted for axial movement on shaft 11 but is restrained against rotation with respect thereto by means of a key 57 or the like. Member 56 is yieldingly retained in the position shown in Figure 1 by a pair of balls or poppets 58, slidably received in a bore 59 in shaft 11 and which are urged outwardly by a compression spring 61. Balls 58 are adapted to seat in recesses 62 formed in member 56 for yieldingly holding the latter in neutral position against axial displacement.

This jaw clutch, because of the configuration of the teeth of the engaging members, is adapted to transmit torque from driven shaft 11 to cover 25 when engaged, but is ineffective to transmit torque from shaft 5 to shaft 11. When shaft 5 tends to drive shaft 11, the camming action of the inclined portions of the teeth upon each other cause it to be automatically disengaged, the direction of rotation of the prime mover being indicated by the arrow in Figure 1. When clutch member 56 is cammed into disengaged position balls 58 snap into recesses 62 under the influence of spring 61 and securely hold it in position.

Member 56 is actuated by a pair of levers 64 secured to a shaft 65 journalled in the lower outturned ends of a pair of bracket members 66 secured to the inner wall of housing 1. The lower ends of levers 64 are provided with curved faces that are adapted to cooperate with the rear face of jaw clutch members 56.

Secured to shaft 65 by means of a pin or the like is an actuating lever 68. Swivelled in an aperture in lever 68 is an apertured member 69, through which a control wire 71 extends. Control wire 71 is held in member 69 by means of a set screw 72 or the like, and extends upwardly into a flexible housing 73, which is secured to one of supports 66 by a clip 74 or the like. Wire 71 and housing 73 form part of the well known Bowden wire control, and the upper end of wire 71 is associated with a control knob and housing 73 is accordingly, in a motor vehicle drive, led up to a convenient position on the vehicle dash for manipulation by the operator.

*Torque multiplying and related mechanisms*

Secured to annular boss 2, formed on housing 1, in any suitable known manner as by means of cap screws 81 or the like, is a bearing support 82, having a cylindrical flange 83 formed thereon. Secured within flange 83 against axial displacement by means of a set screw 84, is the outer race of a bearing assembly 85. The inner race of bearing assembly 85 supports the sleeve-like extension 86 of a planet gear carrier or cage member 87. Sleeve 86 is secured against axial displacement in bearing 85 by a split ring 88 that abuts the inner race thereof, and is sprung into a groove located in sleeve 86. The inner wall of sleeve 86 is splined and cooperates with similar splines located on the outer wall of a secondary clutch sleeve 89. A lock washer 91, having internal teeth formed thereon to cooperate with the splines of sleeve 89, is disposed on sleeve 89 and is clamped between cage member 87 and a nut 92 threaded on the splines of sleeve 89. Nut 92 secures sleeve 89 against axial movement within sleeve 86, and lock washer 91 is provided with external teeth that are adapted to be bent to embrace the sides of nut 92 when nut 92 has been turned home against the lock washer and cage member 87 to hold it in adjusted position.

The rear end of shaft 11 is journalled in bushings 93 or the like located within sleeve 89. Shaft 11 and sleeve 89 are therefore rotatably mounted with respect to each other, and sleeve 89, and sleeve 86 carried thereby, are rotatably mounted in bearing assembly 85.

Bearing support 82 constitutes a partition dividing housing 1 into a clutch chamber and a gear or torque multiplying mechanism chamber, and in order to prevent lubricant contained in the gear chamber from leaking into the clutch chamber between shaft 11, sleeve 89 and the bearing support, I have provided oil returning grooves 94 and 95 in sleeve 89 and bearing support 82 that cooperate with shaft 11 and the outer face of sleeve 89 respectively to return any lubricant that may be disposed between these members to the gear chamber.

Cage member 87 is secured to a mating cage member 96 preferably by means of bolts 97 and nuts 98. The bolt assemblies are preferably three in number and are disposed at 120° intervals about the faces of members 87 and 96, and the cage members are also provided with recesses located between the bolt assemblies which receive planet gears or pinions 99. Planet gears 99 are bushed and are journalled upon shafts 100 supported in apertures in cage members 87 and 96 and mesh with a pinion 101, preferably integrally formed on the rear end of shaft 11.

Disposed in axial alignment with shaft 11, and mounted for rotation at its front end in a bushing 102 located in a recess in the rear end of shaft 11 is driven shaft 103. Shaft 103 may be directly connected to the load handled by the transmission, or may be connected to a gear reduction or the like, and is journalled at its rear end in a bearing assembly 104 retained in an aperture in housing 1 by a combined cap and sealing member 105 secured to housing 1 by cap screws 106 or the like. Cap member 105 is provided with oil returning grooves 107, that cooperate with shaft 103 to prevent leakage of lubricant from the gear chamber.

The intermediate portion of shaft 103 is provided with splines 108, with which a correspondingly splined sleeve 109 is slidably associated. A pair of spaced flanges 111 are formed on the rear portion of sleeve 109, and are adapted to cooperate with a shifting device hereinafter described. Formed on the front portion of sleeve 109 are a plurality of teeth 112, which are shown in Figure 1 as meshing or engaging with a plurality of internal teeth 113 formed on cage member 96.

Mounted for rotation in a bearing assembly 115, secured in a cylindrical bearing support 116 carried by member 2, is the sleeve portion 117 of an internal gear 118, that meshes with planetary gears 99. The outer race of bearing assembly 115 is positioned in member 116 by a set screw 119, and sleeve 117 is held against axial displacement within the inner race by a split ring 122 that is sprung into a groove in sleeve 117. Similar split rings 123 and 124 are sprung into spaced grooves in member 116. Rotatably mounted in member 116, between rings 123 and 124 is a clutch member 125, having recesses or cam pockets 126 formed on the inner face thereof, and notches 127 are formed in its periphery. Overrunning clutch rollers 128 are disposed in recesses 126 and are adapted to cooperate with the outer face of sleeve 117. Rollers 128 are restrained against endwise displacement by means of a split ring 129 sprung into a groove in sleeve 117.

Referring to Figure 6, the outer faces 131 of recesses 126 are so inclined that counter-clockwise rotation of sleeve 117 with respect to member 125 tends to wedge rollers 128 between it and faces 131, and thereby lock sleeve 117 against rotation. Plungers 132, slidably mounted in recesses in member 125, are actuated by springs 133 to urge rollers 128 into wedging or locking relationship with sleeve 117 and faces 131.

The ends of split ring 124 are spaced apart and align with a notch 135 formed in member 116. A latch member 136, rigidly mounted on a crossshaft 137 journalled in the side walls of housing 1, is adapted to have the lower end thereof freely enter the space between the ends of split ring 124 and enter one of the notches 127 located in member 125 to lock the latter against rotation, as shown in Figure 1. With latch member 136 disposed in one of the notches 127 of member 125, sleeve 117 and internal gear 118 may rotate freely in a clockwise direction (viewed from the left hand side of Figure 1), but are restrained against counter-clockwise rotation. When latch member 136 is withdrawn from notch 127, sleeve 117 is free to rotate in either direction. Although counter-clockwise rotative tendencies of sleeve 117 under these conditions causes rollers 128 to be wedged between faces 131 and sleeve 117 to thereby lock members 118 and 125 together, member 125 may rotate in a counter-clockwise direction in member 116 as a journal, due to the fact that latch member 136 is withdrawn from notches 127 in member 125.

Internal teeth 139 are formed on the inner wall of sleeve 117 and are adapted to be selectively engaged with teeth 112 formed on sliding clutch member 109 for a purpose that will be pointed out hereinafter.

Secondary clutch mechanism

Secured to a flange 141, provided on sleeve 89, by means of bolt assemblies 142 or the like is a member 143, that supports and encloses the secondary clutch mechanism, which is similar in general to the primary clutch mechanism. An automatic plate 144 is keyed to member 143 by means of a plurality of symmetrically disposed shouldered pins 145 which seat at one end in recesses 146 formed in the periphery of plate 144 and at their other ends are received in bores 147 located in member 143. Disposed in parallel relation to plate 144, and keyed to member 143, by shouldered pins 148 in a similar manner to the automatic plate, is a reaction plate 149. Plate 149, under the conditions illustrated in Figure 1, is normally yieldingly urged into contact with an annular boss 151 formed in member 143 by a plurality of compression springs 152. Springs 152 seat directly against plate 149 and react against a cover plate 153 secured to the rim of member 143 by cap screws 154. Springs 152 are centered on plate 153 by retainers 155 secured in apertures in plate 153. Plates 144 and 149 are urged toward each other by means of a plurality of shouldered holdback bolts 156 extending through apertures in plate 149 and threaded into plate 144 at 157. Bolts 156 are actuated by compression springs 158, disposed against the heads thereof and bearing against the face of plate 149. While in the present instance, I have disclosed springs 158 and bolts 156 as telescoped within springs 152, it is to be understood that they may be arranged in circularly spaced relation and a practical mechanism obtained.

Mounted for axial movement upon shaft 11, and keyed thereto by means of a key 159 or the like, is a hub 161 having a flange 162 formed thereon. Secured to flange 162, by rivets or the like, is a driving disc 163 that has its central portion offset to clear bolt assemblies 142, and has its peripheral portion disposed between automatic plate 144 and the plane face of member 143. Disc 163 has facings 164 secured thereto, which preferably have a higher co-efficient of friction than those employed in the primary clutch mechanism for a purpose that will presently appear. Disc 163 is adapted to be clamped between plate 144 and member 143 for transmitting torque from shaft 11 to member 143 and sleeve 89.

Plate 144 may be automatically actuated away from reaction plate 149 in accordance with the speed of member 143 to clamp disc 163 between it and member 143 by any suitable speed responsive means. In the present instance, it takes the form of a plurality of centrifugally operable weights 165, which are preferably three in number and are pivoted on pins 166 secured in spaced ears formed on bracket members 167. Brackets 167 are secured to plate 149 by cap screws 168 or the like and are provided with shoulders or stops 169 against which the inner faces of weights 165 bear when they are disposed in their innermost or neutral positions. A pair of spaced levers 171 are formed on each weight 165, and secured in them is a pin 172, upon which a roller 173 is journalled. Each roller assembly extends through an aperture 175, in plate 149 and cooperates with a radial recess 174 in plate 144. Plate 144 is restrained from further movement toward reaction plate 149 under the conditions illustrated in Figure 1, under the influence of holdback springs 158 by rollers 173 acting through levers 171 and weights 165, the latter being held against further inward movement by their stops 169.

As sleeve 89, and member 143 are accelerated above a predetermined speed, a similar acceleration is imparted to weights 165, and they gradually pivot outwardly, in response to centrifugal force. As this occurs, rollers 173 act upon automatic plate 144 and cause it to move toward the driven member against the action of holdback springs 158. When plate 144 has been moved axially sufficiently under the influence of weights 165 to clamp disc 163 between it and member 143, a torque of small magnitude is transmitted to member 143, and reaction plate 149 is forced away from its seat 151 formed on member 143 and pressure build-up in springs 152 is initiated. As weights 165 pivot further outwardly in response to further acceleration of member 143, further pressure is built up in springs 152, and when a predetermined speed is attained, the plates are brought into non-slipping engagement, and a direct drive is established between shaft 11 and sleeve 89. The parts are so designed, that when the latter condition is reached, the outer extremities of weights 165 will lie in contact with the face of plate 149, which stops their movement in a definite plane and prevents them from exerting further driving force upon plate 144.

The general operation of the secondary clutch mechanism and the primary clutch mechanism are similar except for their respective rates of increase of torque transmission as their actuating members are accelerated. The facings employed in the secondary clutch mechanism have a higher coefficient of friction than those employed in the primary clutch mechanism, and therefore the increase in the magnitude of the torque transmitted by the secondary clutch mechanism is more rapid than that of the primary clutch mechanism. The rapidity of plate pressure build-up produced by weights 165 is further augmented as final engagement conditions are approached by the increasing force multiplying effect of levers 171, which have an effect similar to a toggle joint. As levers 171 are brought into positions more nearly normal to the face of plate 144, they effect increasing amplification of the force exerted by weights 165 upon plate 144 and the magnitude of the torque transmitted increases fairly rapidly in comparison with the torque-speed characteristics of the primary clutch mechanism.

Operation

The operation of the mechanism so far developed will now be described. When driving shaft 5 is operating at a predetermined speed, for example, at a speed corresponding substantially to the idling speed of the prime mover utilized therewith, there is no driving connection between shafts 5 and 11, as the primary and secondary clutches are disengaged as illustrated in Figure 1. With jaw coupling 56 and latch 136 in the positions shown in this figure, the mechanism is arranged for forward drive, and acceleration of the driving shaft causes the automatic power transmitting operations to take place.

*Low speed or torque multiplying drive*

As the driving shaft is accelerated, centrifugal weights 42 fulcrum outwardly in response to centrifugal force and cause the primary clutch mechanism to be engaged in the manner previously described, thereby coupling shafts 5 and 11. Clockwise rotation of shaft 11, viewed from the left end of Figure 1 through the medium of pinion 101 formed thereon, tends to produce counter-clockwise rotation of planet gears 99 about their axes, assuming that rotation of 103, to which they are connected, is resisted by a load, or the like. Counter-clockwise rotative tendencies of planet gears 99, imposes a reaction upon internal gear 118, tending to produce counter-clockwise rotation of the latter. Counter-clockwise rotation of internal gear 118 however is prevented by the action of clutch rollers 128, which cooperate with sleeve 117 and member 125 under these conditions to lock sleeve 117 against rotation. Planet gears 99 are therefore caused to planetate clockwise within stationary internal gear 118, which produces similar rotation of cage members 87 and 96, sleeve 89, sliding clutch member 109, and shaft 103, upon which the latter is splined. A torque multiplying coupling is therefore automatically established between driving shaft 5 and driven shaft 103, the torque amplification depending upon the gear ratios utilized.

*Automatic transition from torque multiplying drive to direct drive*

With shafts 11 and 103 coupled through the medium of pinion 101 and planet gears 99, as previously explained, when shaft 103 attains a speed corresponding to a speed of the prime mover sufficiently high to enable the latter to deliver adequate torque to handle the load without torque multiplication, centrifugal weights 165 pivot outwardly and cause engagement of the secondary clutch mechanism to be effected. Engagement of the secondary clutch mechanism causes torque to be transmitted from shaft 11 through disc 163, member 143, and sleeve 89 to the driven shaft and the latter is accordingly gradually accelerated under the combined influence of the torque multiplying drive and the direct torque transmitted through the secondary clutch mechanism. Acceleration of shaft 103 in this manner causes internal gear 118 to rotate in a clockwise direction, which in turn causes disengagement of rollers 128 from their wedging disposition between sleeve 117 and member 125. When engagement of the secondary clutch mechanism is complete, shafts 11 and 103 rotate in unison, and internal gear 118 is also given a like rotation because planet gears 99 do not rotate about their axes at this time in view of the fact that they are journalled in cages 87 and 96 and mesh with pinion 101, which are stationary with respect to each other.

When operating a vehicle provided with an automatic transmission mechanism of the character described in direct drive, all that is necessary to bring it to a stop, is to release the accelerator and to apply the brakes. When the vehicle has decelerated to a predetermined speed, through the combined braking action of the engine and the brake mechanism, centrifugal weights 165 are restored to their neutral positions under the influence of holdback springs 158, releasing the secondary clutch. Shaft 103, under the influence of the momentum of the vehicle, then causes gears 99 to planetate around pinion 101. The engine tends to drop to idling speed because the throttle is usually closed under these conditions. This tendency of the engine causes pinion 101 to resist rotation of planet gears 99 and the latter are accordingly restrained from planetating, and they rotate in a clockwise direction as viewed from the left end of Figure 1, about their respective axes, and cause internal gear 118 to rotate in a similar direction. As the overrunning clutch will lock gear 118 only against counter-clockwise rotation, clutch rollers 128 will be shifted into their disengaged positions, and gear 118 will rotate in its bearings 115, thus relieving the gears of all tooth pressure, the driving connection will be broken and the engine will accordingly drop to idling speed, releasing the primary clutch connection between shafts 5 and 11, until the engine is again accelerated to a speed corresponding to the engaging speed of the primary clutch. Although the braking effect of the engine is not utilized after disengagement of the secondary clutch, the vehicle speed at which centrifugal weights 165 retract is so low that the greater part of the braking effect of the engine has already been utilized in decelerating the vehicle, and is entirely adequate under normal operating conditions. As soon as disengagement of the clutch interconnecting shafts 5 and 11 occurs, shaft 11 and driven member 17 are free to idly rotate and may do so under the influence of shaft 103 acting through the gears. Gear 118 may likewise rotate since it is urged in a clockwise direction by planets 99, so long as shaft 103 rotates. However, under these conditions little or no rotation of planets 99 about their axes occurs, depending upon the friction present in the bearings for shaft 11 and gear 118 respectively.

After both clutch mechanisms are released, the vehicle may be brought to a complete stop by continued application of the brake mechanism, or if desired, the engine may be accelerated, causing weights 42 to swing outwardly about their pivots thereby coupling shafts 5 and 11. Pinion 101 will then drive planet gears 99 and the reaction of gears 99 against internal gear 118 tends to produce counter-clockwise rotation of gear 118, thus causing clutch rollers 128 to lock gear 118 in a stationary condition, thereby causing planet gears 99 to planetate, again transmitting amplified torque to shaft 103. When shaft 103, and consequently the vehicle, attains sufficient speed, centrifugal weights 165 again swing outwardly about their pivots and actuate the secondary clutch to again establish a direct drive between shafts 11 and 103 in the manner previously described.

*Manual disconnection of the driving and driven shafts*

It is sometimes desirable to disconnect the prime mover from the load for the purpose of allowing the prime mover to operate substantially above idling speed to "warm up", or for effecting adjustments of the carburetor thereof, if it is an engine of the internal combustion type. To this end, sliding clutch member 109 is adapted to be moved axially to bring its teeth 112 out of engagement with teeth 113 formed on cage member 96. Clutch member 109 may be operated in any suitable manner, but I prefer to actuate it by means of a lever 181, rigidly secured to shaft 137. Lever 181 is offset at its lower end to clear flanges 111, and is provided with a shouldered pin 182. The reduced portion of pin 182 extends through an aperture in lever 181 and has the end thereof swaged over to hold it securely in place. Secured to lever 181, intermediate its length, by rivets 183 or the like, is a curved finger 184 provided with a similar pin 185. Pins 182 and 185 are disposed between flanges 111, and upon oscillation of shaft 137 produce axial movement of clutch member 109 upon shaft 103.

The parts are so designed, that when shaft 137 has been oscillated to bring sleeve 109 with the teeth 112 thereof out of engagement with teeth 113 formed on cage member 96, lever 136 is simultaneously actuated to cause it to be withdrawn from latching engagement with member 125. When the parts are arranged in this condition, and the driving shaft is accelerated, the primary clutch couples shafts 5 and 11 as previously explained, and the resulting rotation of gear 101 produces counter-clockwise rotation of internal gear 118 and clockwise rotation of the cage members and sleeve 89. Clockwise rotation of cage member 97 does not produce similar rotation of shaft 103, due to the disengaged condition of clutch member 109, and driving shaft 5 may accordingly be accelerated to any desired speed without transmitting torque to shaft 103. If the sleeve 89 is accelerated sufficiently, the secondary clutch mechanism will be engaged as previously explained, but the only effect of such engagement is to cause shaft 11, cage members 87 and 96, and internal gear 118 to be driven in unison, without transmitting torque to driven shaft 103.

*Reverse drive*

The gear mechanism employed for effecting forward torque multiplying drive is also used to obtain reverse drive. The planet carrier is locked against rotation when reverse drive is employed, and to this end, the periphery of cage member 87 is provided with a plurality of teeth 186. Cooperating with teeth 186 is a latch member 187, which is preferably formed as an integral part of lever 136.

When it is desired to shift the mechanism for reverse drive, shaft 137 is oscillated sufficiently to cause latch member 187 to enter the space between two adjacent teeth 186 formed on cage member 87, thereby locking both cage members and sleeve 89 against rotation. Oscillation of shaft 137 in this manner is preferably designed to cause lever 136 to be withdrawn from the particular notch 127 with which it is engaged in member 125, and to simultaneously shift sliding clutch 109, through lever 181, into a position where the teeth 112 thereof are engaged with internal teeth 139 formed on the inner wall of sleeve 117.

With shaft 137 rotated in this manner, the parts are disposed in reverse drive position, and acceleration of the driving shaft causes the primary clutch mechanism to automatically couple shafts 5 and 11 in the manner previously described, and clockwise rotation of pinion 101, carried thereby, produces counter-clockwise rotation of planet gears 99 about their axes. The axes of planet gears 99 are restrained against movement because of the locked condition of the cage members at this time. Counter-clockwise rotation of planet gears 99 produces similar rotation of internal gear 118, and driven shaft 103 to which it is coupled by clutch member 109. In view of the fact that sleeve 89 is held stationary, the secondary clutch mechanism is maintained in disengaged or inoperative condition regardless of to what extent shafts 11 and 103 are accelerated in reverse drive.

*Amplified motor-braking*

With the present power transmitting mechanism installed in a motor vehicle or the like, direct drive or high gear motor braking during normal operating conditions is obtained in the manner previously explained. Under some conditions, for example in descending long mountain grades, it is desirable to materially augment the action of brake mechanism by causing the momentum of the vehicle to be applied to the engine through the torque multiplying mechanism. Under normal coasting operating conditions, internal gear 118 is caused to over-run without applying torque to the engine when the secondary clutch is disengaged and I have therefore provided means that may be selectively employed to hold internal gear 118 stationary at will. The outer face of internal gear 118 is provided with a plurality of teeth 191, that are preferably integrally formed thereon. A cross-shaft 192 is journalled in housing 1 and rigidly carries a latch member 193 thereon that is adapted to enter the spaces between teeth 191 and lock gear 118 against rotation.

If the vehicle is proceeding with the engine delivering power through the torque multiplying mechanism, shaft 192 may be oscillated and latch member 193 readily brought into locking engagement with teeth 191, because planet gears 99 react against internal gear 118 to cause the latter to be brought to rest against the influence of rollers 128 under these conditions. The accelerator is released after gear 118 is locked or latched, and the engine tends to drop to idling speed, but the momentum of the vehicle transmitted to shaft 103 causes planet gears 99 to planetate within stationary internal gear 118 and impart clockwise rotative efforts to pinion 101, and shafts 11 and 5, which tends to accelerate the engine above its idling speed. An amplified engine braking effort is thus applied to the vehicle wheels.

In the event that the primary and secondary clutches are disengaged, and internal gear 118 is over-running, and it is desired to obtain amplified motor braking, the engine is slightly accelerated prior to oscillation of shaft 192. Acceleration of the engine first causes engagement of the primary clutch, and the resulting clockwise rotation of shaft 11 causes planet gears 99 to react against internal gear 118 and tends to produce counter-clockwise rotation thereof. As soon as gear 118 tends to rotate in a counter-clockwise direction, it is locked by rollers 128, and latch member 193 may then be readily introduced between teeth 191 to lock gear 118 against rotation in the manner previously described.

*Manual coupling of driving and intermediate shafts*

When the vehicle engine, or other prime mover is stationary, the primary clutch is automatically disengaged and shafts 5 and 11 are disconnected. When it is desired to couple shafts 5 and 11 under these conditions the dash or other suitable control is operated to bring jaw clutch member 56 into engagement with teeth 54 formed on member 25. If the vehicle is then towed or coasted to turn the engine over for the purpose of cranking it, the initial speed imparted to shaft 103 merely results in internal gear 118 over-running in a clockwise direction, and since planet gears 99 planetate about stationary pinion 101 under these conditions, they do not transmit torque thereto and shaft 11 and 103 are accordingly disconnected. As the speed of shaft 103 is accelerated in response to towing or coasting the vehicle, member 143 is likewise accelerated, and when the speed is sufficiently great, the secondary clutch engages and directly couples shafts 103 and 11. A direct coupling now exists between shafts 103 and 5, and the engine is turned over or cranked. When the engine starts in response to the cranking operation, the inclined faces of teeth 54 and 55 cooperate to cause jaw clutch member 56 to be cammed or moved into disengaged position, where it is retained by poppets 58. While I have disclosed, and prefer to employ inclined teeth in the jaw coupling, it is to be understood that square or other suitably designed teeth may be employed in order to secure a two-way coupling for transmitting torque from shaft 5 to shaft 11 when the primary clutch is disengaged.

In Figure 8 of the drawings I have disclosed one method of actuating shafts 137 and 192. Referring to Figure 8, a lever 201 is secured to shaft 137 by means of key 202 or the like and has an apertured member 203 swivelled to the end thereof. A control wire 204 is received in member 203, and is retained in adjusted position therein by means of a set screw 205. Control wire 204 extends into a flexible housing 206 that is secured to housing 1, or any other suitable support, by means of a bracket 207.

Lever 201 is illustrated in Figure 8 in the position it assumes for forward drive, the dotted lines indicating the positions it takes for neutral and reverse drive respectively.

Shaft 192 is similarly provided with a lever 208, control wire 209, and flexible housing 211, and in Figure 8, lever 208 is shown in the position it assumes when latch member 193 is disengaged from teeth 191. The dotted lines indicate the engaged position of lever 208.

Housings 206 and 211 form part of the well known Bowden wire control, and are led up to a convenient location on the vehicle dash for manipulation by the driver of the vehicle. It is to be understood that these Bowden wire controls, as well as that employed to actuate member 56, may be associated with any suitable mechanism for coordinating their operation in any manner desired.

It is therefore seen, that with the present drive mechanism the necessity for a clutch pedal and gear shift lever is entirely dispensed with, and the number of controls in the driver's compartment of the vehicle materially reduced, a brake pedal and accelerator constituting the entire control mechanism for the normal operation of the vehicle for forward drive, reverse drive being obtained by a simple dash controlled device.

Due to the smooth operating characteristics of the primary automatic clutch mechanism, and its ability to smoothly transmit torque efficiently under slipping drive conditions, if called upon, it could in fact be employed to directly couple shafts 5 and 103, and would stand up under these conditions in view of the character of the facing material employed therein and the heat dissipating capabilities thereof. Therefore, the ratio of the gearing interposed between shafts 11 and 103 may have a fairly low multiplication and yet permit the vehicle to be started on steep grades with perfect ease. This is a particularly desirable characteristic for the reason that when the vehicle is being accelerated through the intermediary of gears 99 and 101, the relative speed of shafts 11 and 103, is not excessive and when shaft 103 reaches sufficient speed, and the secondary clutch operates, the latter is not called upon to bring two shafts into synchronism that are rotating at widely variant speeds, and it therefore can smoothly and efficiently perform the functions required.

While the mechanism shown provides only a single gear reduction, which is entirely satisfactory in a light vehicle of the pleasure car class, it is to be understood that in heavy duty vehicles, such as trucks, busses, rail cars and the like, two or more of the transmission units disclosed would be disposed in series behind a single primary clutch to give two or more gear reductions, and in such case the centrifugal weights of the first secondary clutch mechanism would be so designed as to move into full engagement considerably before the centrifugal weights of the second secondary automatic clutch mechanism came into play, so that a direct drive would be established between the shaft coupled by the first secondary automatic clutch mechanism while torque is transmitted between the shaft coupled by the secondary clutch mechanism through the gear reduction. In such a power transmitting mechanism final conditions are reached when the primary automatic clutch mechanism and all of the secondary automatic clutch mechanisms are fully engaged and a direct drive is established from the engine to the rear wheels of the vehicle.

While I have disclosed and prefer to employ centrifugal mechanism for causing engagement of the primary and secondary automatic clutch mechanisms, it is to be understood that any suitable speed-responsive mechanism for bringing relatively rotating shafts into synchronism may be substituted for the primary and secondary clutches here disclosed and an operable mechanism obtained, for instance, fluid actuated means, such as an expansible chamber, could be incorporated between automatic plate 22 and reaction plate 28 of the primary clutch mechanism to cause automatic plate 22 to clamp driven member 17 between it and the flywheel, and such fluid could be supplied to the chamber under pressures that would be proportional to the speed of driving shaft 5, for instance, by a pump driven thereby. The secondary clutch could be similarly actuated, fluid being supplied therefor at pressures proportional to the speed of rotation of shafts 103 or 11.

In practice the secondary or direct coupling clutch operated by weights 165 is preferably designed so that complete engagement thereof is attained comparatively rapidly, and full engagement occurs with a speed difference of approximately ten to twelve percent or less, or approximately one tenth of the speed difference in which slipping drive conditions exist in the primary clutch so that the opportunity for prolonged slipping during load conditions under which the direct coupling clutch is in slipping drive engagement as might occur under unusual conditions in practice, is reduced to a minimum.

Referring to the novel power transmitting mechanism illustrated in Figure 1 of the drawings, the secondary automatic clutch mechanism operates solely in response to the speed of rotation of shaft 103, which may, for all purposes, be considered as the final driven shaft because the torque amplifying coupling is disposed between it and the prime mover. The secondary clutch mechanism may be so designed as to operate in response to the speed of shaft 11, and this organization is intended to be embraced by the present disclosure, because, in view of the fact that it in such an event would be carried by intermediate shaft 11, which is definitely coupled with the driven shaft through the interposed gear mechanism, it would therefore operate proportional to the speed of the driven shaft. This is a highly desirable feature for the reason that operation of such secondary clutch mechanisms is entirely independent of the speed of rotation of the prime mover, but is dependent upon the speed of the final driven shaft, and, since the speed of the final driven shaft or the load is the essential factor in the operation of the secondary automatic clutch mechanism, such operation should take place when the load has been accelerated to a speed where the prime mover has developed sufficient power to cause further acceleration of the load without the aid of torque amplifying mechanisms. Therefore secondary clutch operation should not depend solely upon the speed of the prime mover, but should be correlated with the speed of the load and the prime mover.

Moreover the present organization allows the holdback springs and centrifugal weights of the secondary clutch mechanisms to be of substantialy similar design to those employed in the primary clutch mechanism, whereas, if the secondary clutch mechanism were dependent upon, and wholly responsive to the speed of the prime mover, it would be necessary to specially design the springs and weights for operation at a higher speed than that of the primary automatic clutch mechanism driven by the prime mover. Otherwise, upon acceleration of the prime mover, both clutch mechanisms would operate almost simultaneously to directly couple the prime mover with the intermediate shaft 11 and the final driven shaft, and the torque amplifying coupling therefore could never be utilized.

In a vehicle provided with power transmitting mechanisms of the character that I have disclosed, if it is desired to start the vehicle on a grade, the engine is accelerated and the primary automatic clutch mechanism operates to establish a slipping torque transmitting coupling between the prime mover and the intermediate shaft as previously explained. Rotation of the intermediate shaft, through the medium of the interposed gearing, causes an amplified torque to be transmitted to the driven shaft. Through the slipping drive coupling existing between the prime mover and the load, the prime mover is allowed to accelerate and operate efficiently on a relatively high point on its speed-torque curve to develop adequate power to start the vehicle, even through the interposed gear mechanism may have only a low torque amplification. During this operation, the secondary automtic clutch mechanism is inactive since it relies for its actuation upon the speed of the load, and the only connection existing between the prime mover and its load is that established by the interposed gearing, which supplies sufficient torque amplification to enable the engine to effectively handle the load under these conditions.

By way of a concrete example, assuming that the novel transmission mechanism herein disclosed is incorporated in a motor vehicle, and the transmission gearing has a reduction of 2 to 1, the primary clutch mechanism initiates operation at an engine speed of 500 revolutions per minute, completing its operation at an engine speed of 1000 revolutions per minute, a non-slipping drive with torque amplification is thereby established between the engine and the rear wheels when the engine is operating substantially at 1000 revolutions per minute. With normal rear axle gear ratios, this results in a vehicle speed of 10 miles per hour, although it is to be understood that completion of primary clutch operation may take place at a higher or lower vehicle speed, depending upon whether the vehicle is ascending or descending a grade or proceeding on a level surface.

Under these conditions the secondary clutch mechanism, due to the fact that it is actuated in accordance with the speed of the driven shaft and vehicle wheels coupled thereto, may be designed to operate to directly couple the engine and rear wheels to any desired vehicle speed, for instance 15 miles per hour, and such operation is therefore entirely independent of speed fluctuations of the engine.

On the other hand, if the secondary automatic clutch mechanism were responsive to the speed of the driving member and was designed to initiate operation at a vehicle speed of 15 miles per hour, corresponding to an engine speed of 1500 revolutions per minute, and to complete its operation at 1800 revolutions per minute, this would not result in a vehicle speed of 18 miles per hour, because a direct drive would then be established, and the engine speed of 1800 revolutions per minute would result in a vehicle speed of 36 miles per hour. Therefore, with mechanisms wherein, both primary and secondary clutch mechanisms are responsive to the speed of the driving members, a slipping drive is initiated at a vehicle speed of 15 miles per hour and is not terminated until the speed of 36 miles per hour is attained, thereby effecting a direct coupling between the driving and driven members only after an extremely prolonged slipping operation. Accordingly, while I may make both the primary and secondary clutches responsive to the speed of the driving member and such constructions are within the scope of my invention, the preferable form of my invention utilizes mechanisms wherein the primary clutch mechanisms are responsive to the speed of the driving member, and the secondary clutch mechanisms are responsive to the speed of the driven member.

Although I have disclosed, and prefer to employ planetary gear mechanisms in connection with the power transmitting mechanism illustrated, it is to be understood, that if desired a countershaft and a suitable gear organization may be employed for obtaining a torque amplification between the prime mover and the load, and an over-running clutch or the like incorporated in one of the gears or shafts so that the torque amplifying coupling will be automatically disconnected when the direct coupling operation between the intermediate and driven shafts is initiated. Such countershaft organization may, if desired, be also provided with a sliding gear cooperating with an idle gear for imparting reverse rotational efforts to the driven shaft.

Referring now to Figure 9 of the drawings, I have disclosed an automatic power transmitting mechanism that is similar in many structural and functional respects to the mechanism that has just been described. Accordingly, corresponding or like parts of the two mechanisms will be given like reference characters, and a detailed description of their respective functions omitted in the interest of brevity.

With continued reference to this figure, a suitable vibration dampener denoted generally by the reference character 215 is interposed between hub 15a and driven disc 17 for the purpose of dampening out torsional vibrations that may be set up in the crankshaft of the prime mover, and also for improving the engagement characteristic of the primary clutch mechanism. This vibration dampener may consist of any suitable device that has operating characteristics adapting it for this purpose, but it is preferably constructed in accordance with the disclosure of co-pending application, Serial No. 672,364, filed May 22, 1933.

The cover member 25a in this instance is slotted at 120° intervals around its periphery and the metal adjacent each slot is bent or formed to provide recesses 217. The bent portions 218 of cover 25a are designed to form stops 219 for weights 42. Automatic plate 22a and reaction plate 28a are provided with lugs or ears 221 and 222 respectively which seat in recesses 217 and lie in driving engagement with portions 218 of cover 25a.

The pressure spring assemblies in this form of the invention are of a somewhat modified character and each of them consists of a compression spring 223 seating against reaction plate 28a. The other end of spring 223 is received in, and seats against the bottom of a flanged cup 224 located in an aperture in cover 25a. A bolt 225 extends through aligned apertures in plate 28a and cup 224 and has a castle nut 226 turned thereon. Nut 226 is held in adjusted position on bolt 225 by any suitable means, such as a cotter pin 227 or the like. Plate 22a is provided with countersinks 228 which receive the heads of bolts 225.

Teeth 54a are formed in an annular plate 229 secured to the rear face of cover 25a, and cooperate with teeth 55a formed in jaw clutch member 56a in the manner described in connection with Figure 1. Member 56a is also provided with internal teeth 233 which are adapted to mesh with splines 234 formed on sleeve 235. Sleeve 235 is rotatably mounted upon shaft 11 and is restrained against axial movement thereon by rings 236 which are held in place by split rings 237 sprung into grooves in shaft 11. Hub 161a is internally splined and mounted upon sleeve 235.

Flange 141 of sleeve 89 is provided with an annular groove 238 which is adapted to have any lubricant that may leak past oil-returning grooves 94 centrifugally deposited therein. A plurality of radial passages 239 are formed in flange 141 and communicate with groove 238. Passages 239 are adapted to convey lubricant that may be contained in groove 238 away therefrom. This lubricant interceptor causes any excess lubricant to be deposited in the housing in such manner that it cannot contaminate and possibly modify the coefficient of friction of the friction facings employed in the primary or secondary clutch mechanisms.

Referring to the over-running clutch employed in this mechanism, outer race member 125 is rotatably disposed within support 116 between a pair of plates 241 and 242 respectively. Plate 242 is provided with a recess 243, and the entire assembly is held in place by a split ring 244 which is sprung into a groove in member 116 and whose ends terminate in spaced relation so as to be flush with the walls of recess 243. In this instance the configuration of housing 1 is modified so that the bottom wall thereof is contiguous with support 116.

In this form of the invention, lever 181a performs the functions effected by levers 136 and 181 shown in Figure 1, and to this end is provided with an integral latch portion 246 which cooperates with notches 127 of member 125. Lever 181a is also provided with an integral key 247 that seats in a keyway formed in shaft 137a.

The secondary clutch mechanism employed in this form of the invention is similar in function to that previously described, but is constructed in a somewhat different manner. Member 143a is designed to provide an annular recess within which the mechanism is disposed. Secured to member 143a by bolts 142 is an angular member 251 which provides a cone face 252. Driving disc 163a is dished to bring the inner facing 164 thereof into cooperating nesting relation to face 252.

Automatic plate 144a has an inner cone face 253 for cooperation with the outer facing 164 of disc 163a, and is provided with lugs 254 disposed at 120° intervals about its periphery. Each lug 254 is disposed between and is in driving engagement with a pair of ears or lugs 255 formed on the inner wall of cover member 153a. Cover 153a is threaded into member 143a at 256, and is retained in adjusted relation therewith by a cap screw 257 threaded into member 143a. Screw 257 is provided with a reduced portion 258 that is adapted to be selectively positioned in one of a plurality of recesses or notches 259 located in the periphery of cover 153a, to hold the latter in adjusted position. Lugs 255 constitute stops to limit movement of reaction plate 149a toward member 143a, and reaction plate 149a is provided with recesses 261 coinciding with lugs 255, to facilitate insertion thereof into the mechanism. In assembling the device, reaction plate 149a is inserted in cover 153a with notches 261 thereof aligning with lugs 255 of cover 153a. After the reaction plate has been inserted past lugs 255 it is rotated to bring apertures 262 therein into alignment with apertures 263 located in cover 153a.

A plurality of centrifugal weights 165a which are similar to weights 42 of the primary clutch mechanism, have their lever portions extended through aligned apertures 262 and 263 in reaction plate 149a and cover 153a respectively and cooperate with recesses 264 in plate 144a to cause actuation thereof in a manner similar to that of the automatic plate in the first form of my invention. Weights 165a stop against lugs formed in cover member 153a.

The pressure springs 152 in this form of the invention react against the bottom of flanged cup members 266 located in apertures in cover 153a, while hold-back bolts 156, and springs 158 carried thereby extend through apertures in the bottom of cup members 266.

Due to the fact that automatic plate 144a in the present mechanism frictionally grips or wedges the driven member between it and member 251, a comparatively slow pressure build up between them produces a fairly rapid increase in the magnitude of the torque transmitted from shaft 11 to member 143a. Therefore, substantially the same result is effected, as that obtained with the force multiplying or toggle mechanism employed with the centrifugal weights of the first form of my invention. Compensation for wear of facings 164 is effected by removing screw 257 and rotating cover 153a to dispose the automatic plate closer to the driven member.

In this form of the invention, internal gear 118 is provided with a smooth outer face 269, which is encircled by and cooperates with a brake band 271. Band 271 is preferably constructed of spring steel and is designed to have sufficient inherent resilience to firmly grip face 269 when it is not under the influence of the expanding mechanism to be presently described.

One end of band 271 is looped over and anchored to the reduced extremity 272 of one of the cap screws 273 employed to secure bearing support 82a within the housing. Band 271 preferably consists of three convolutions, disposed side by side on the outer face of internal gear 118, and the other end thereof is provided with a radially extending portion or finger 274 that is disposed in a recess 275 formed in housing 1. Portion 274 of band 271 is adapted to cooperate with a cam 276 formed on a shaft 277 journalled in housing 1. In Figure 12, the brake band is shown in disengaged or expanded condition.

Shaft 277 is provided with a reduced portion 278. A cap screw 279 is threaded into housing 1 and its tapered extremity loosely engages in portion 278 of shaft 277 to hold the latter against axial displacement and yet permit oscillation thereof. Cap screw 279 is locked against rotation by means of a wire 281, extending through an aperture in the head thereof, and secured to a lug 282 formed on housing 1a. Shaft 137a is likewise provided with a reduced portion 283 which is engaged by a cap screw 284 for holding it against axial displacement.

Shafts 137a and 277 protrude from housing 1a and are actuated or oscillated in a manner to be presently set forth.

With internal gear 118 rotating in the direction indicated in Figure 12, oscillation of shaft 277 brings the flat side of cam 276 into cooperation with finger 274, and band 271, due to its inherent tendency to contract, frictionally grips face 269 and causes deceleration of internal gear 118. The frictional action of face 269 upon band 271 tends to cause band 271 to wrap itself around or more firmly grip face 269, therefore no positive contracting mechanism is required to cause band 271 to grip face 269 to efficiently bring internal gear to rest, and the actuating force applied to shaft 277 accordingly need only be of small magnitude.

Shaft 103 in this form of the invention has a gear 286 secured thereto which meshes with a gear 287 mounted upon a shaft 288 journalled in cap member 105a. Shaft 288 is adapted to be coupled to a speedometer drive, (not shown). Secured to shaft 103, by means of a nut 289, is a sleeve 291, to which a universal joint or the like is adapted to be secured in well known manner. Also secured to sleeve 291, as by spot welding or the like, is a brake drum 292, which is adapted to cooperate with any well known type of brake mechanism, (not shown), and may be employed to decelerate the load handled by the transmission.

Operation

By properly shifting clutch member 56a into engagement with the splines of sleeve 235 or into engagement with teeth 54a of cover 25a, and oscillating shaft 137a to bring the latch members carried thereby into forward drive, neutral or reverse drive positions, all of the operations, with the exception of the amplified motor-braking operation, described in connection with the mechanism disclosed in Figure 1 may be readily carried out in a similar manner, and therefore the description of these operations will not be repeated.

Amplified motor-braking

In the event the vehicle in which the mechanism is installed is starting to descend a long mountain grade, or like instance, and the transmission is operating in direct or indirect drive, and it is desired to augment the vehicle brake mechanism by the braking effect of the engine, as amplified by the torque multiplying mechanism, jaw clutch member 56a is shifted to bring its teeth out of mesh with splines 234, and shaft 277 is oscillated to cause band 271 to bring internal gear 118 to rest. These operations are preferably effected in the sequence given.

In the event that the secondary clutch is engaged, operation of member 56a in this manner disconnects the direct drive that exists between shafts 11 and 103 through the secondary clutch. On the other hand if the secondary clutch is disengaged, operation of member 56a merely prevents engagement of the secondary clutch mechanism from establishing a driving connection between shafts 11 and 103.

Deceleration of internal gear 118 causes planet gears 99, which were previously rotating as a unit in a clockwise direction with internal gear 118, to commence to planetate clockwise within it. Clockwise planetation of gears 99 causes them to drive pinion 101, and the prime mover coupled therewith through the primary clutch, in a clockwise direction, imparting a speed of rotation thereto that is greater than that of shaft 103. When internal gear 118 is brought to rest under the influence of brake band 271, a torque multiplying coupling exists between shafts 11 and 103 that is similar to that obtained in the low speed or torque multiplying operation previously described, and the coasting tendencies of the vehicle are under the control of the braking effect of the engine as amplified by the torque multiplying mechanism, as the throttle thereof is usually disposed in a position corresponding to engine idling speed under such conditions.

In the event that the vehicle, in descending a grade against the influence of the amplified braking effect of the engine, attains sufficient speed, the secondary clutch mechanism will automatically engage, but such engagement is ineffective to establish a direct driving connection between shafts 11 and 103 because shaft 11 is disconnected from driving member 163a at this time, and the mechanism in fact behaves as though the secondary clutch were absent.

Should an up-grade be encountered when the mechanism is operating in this manner, the engine throttle may be opened and the vehicle driven thereby through the torque multiplying mechanism.

When it is desired to re-establish the normal operating condition of the mechanism, shaft 277 is oscillated to expand band 271 and withdraw it from contact with face 269, and jaw clutch member 55a is shifted into meshing cooperation with splines 234. Internal gear 118 is accordingly again free to rotate, and the secondary clutch is again rendered operative to couple shafts 11 and 103 when the speed of the latter is properly correlated with that of shaft 5.

*Permanent torque multiplying coupling operation*

In ascending long mountain grades, that are too steep for the engine to handle the vehicle in direct drive, it is desirable to prevent the automatic transition from indirect to direct drive from taking place, so that the engine may propel the vehicle through the torque multiplying mechanism, at speeds in excess of that corresponding to secondary clutch engagement speed so as to avoid improper and undesirable slippage of the latter.

Member 56a is shifted, and shaft 277 is oscillated, in precisely the same manner described in connection with the motor-braking operation just described. Under these conditions, shaft 103 may be accelerated through pinion 101, planet gears 99, and stationary internal gear 118, and although the secondary clutch may engage when the speed of shaft 103 becomes sufficiently great, it is ineffective to establish a driving connection between shafts 11 and 103 because driving member 163a thereof is disconnected from shaft 11.

Although band 271 holds internal gear at rest under these conditions, it is superfluous insofar as forward drive is concerned, because, as has been previously explained, clockwise rotation of pinion 101 causes planet gears 99 to react against and tend to produce counter-clockwise rotation of internal gear 118. Counter-clockwise rotative tendencies of internal gear 118 causes rollers to lock it against rotation. Member 56a and shaft 277 may therefore be separately operated, member 56a only being actuated for the operation just described, but they are preferably interconnected for the purpose of simplifying the design of the control mechanisms therefor. Band 271, under these conditions, restrains movement of gear 118 in a counter-clockwise direction, and therefore should a reversal of drive occur, and shaft 103 tend to over-run with respect to shaft 11, when the parts are disposed in this position, amplified motor braking is obtained. Operation of the brake for the internal gear and the coupling for the secondary clutch simultaneously in this manner therefore provisions the mechanism for permanent low gear operation, and at the same time provisions it for amplified motor braking and the control mechanism may accordingly be simple in design.

However, should it be undesirable, in the particular type of drive involved, to apply a braking influence to gear 118 when the secondary clutch is disconnected for obtaining a permanent torque multiplying drive, member 56a and shaft 277 may be independently controlled, and it is to be understood that this method of their control is also embraced by the present invention.

Referring now to Figure 14, I have disclosed one form of mechanism that may be employed to control the actuating elements of the mechanism just described. With continued reference to this figure, a lever 293 is rigidly secured to shaft 137a and carries a swivelled member 294. A control wire 295 is received in an aperture in member 294 and is secured therein by means of a set screw 296 or the like. Control wire 295 is enclosed in a flexible housing 297 and is led up to a convenient operating location and is provided with an actuating knob 298.

Knob 298 is shown in Figure 14 in "neutral" position. When reverse drive is desired, knob 298 is pulled out into the dotted line position, and this actuates lever 293 into its dotted line reverse position. During normal driving operations, knob 298 is disposed in its inner dotted line position, and lever 293 is disposed in its "forward" dotted line position. Means are preferably provided in the upper end of housing 297, (not shown) for yieldingly holding wire 295 in its three operative positions and prevent inadvertent movement thereof.

Secured to cam-shaft 277 is a lever 299 that pivotally carries a link 300. Link 300 is pivotally connected to one arm of a lever 301, and the latter is pivotally supported on housing 1a in any desired manner. A tension spring 302 is connected to lever 301 and is attached to a bracket 303, and the latter is secured to housing 1a or any other stationary part of the mechanism or vehicle.

The other arm of lever 301 is formed as a cam finger and cooperates with a cam 304 which is secured to a shaft 305. Shaft 305 is supported on housing 1a in any suitable manner and rigidly carries a lever 306 thereon. Spring 302 urges lever 301 into contact with cam 304 at all times.

A Bowden wire control, designated generally as 307, is connected to lever 306 and to a swivelled member 308 mounted on a lever 309, and the latter is pivotally supported upon housing 1a. Bowden control wire 71, for actuating sliding clutch member 56a, is also secured to a member 310 which is swivelled in lever 309. Lever 309 is actuated by means of a master Bowden wire control assembly designated as 312, and actuating knob 313 thereof is adapted to be actuated into three different operative positions.

With control knob 313 disposed in its full line (intermediate) position, wire 71 is disposed so as to position sliding clutch member 56a in its intermediate position. Under these conditions, lever 301 assumes its full line position, and the parts are so designed, that when lever 301 assumes this position, cam face 276, (Figure 12) will be so disposed as to allow band 271 to contract and frictionally grip the outer face of internal gear 118. Accordingly, when the parts are disposed in their full line positions, the mechanism is provisioned for operation through a permanent torque multiplying connection.

Movement of control knob 313 into its outer position, through lever 309 and wire 71, causes clutch member 56a to move to the right, (Figure 9) and bring its teeth 233 into engagement with splines 234. Movement of lever 309, through Bowden wire 307, causes cam 304 to rock clockwise and allow spring 302 to actuate lever 301 and link 300, and rock cam shaft 277 so as to disengage band 271 from the face of internal gear 118. The parts of the transmission are now disposed in the positions in which they are shown in Figure 9, and the device is provisioned for normal automatic driving operations.

When knob 313 is pushed from its intermediate into its inner dotted-line position, clutch member 56a is moved into engagement with teeth 54a of cover 25a and shafts 5 and 11 are thereby manually coupled. Movement of knob 313 in this manner, through lever 309, Bowden wire 307 and lever 306, causes cam 304 to rock counterclockwise and allow spring 302 to operate cam shaft 277 and disengage band 271 from gear 118 in the manner previously described. The mechanism now provides a one-way torque multiplying connection from shaft 5 to shaft 103. If desired, however, the parts may be designed to provide a two-directional, torque-multiplying drive between shafts 5 and 103 when knob 313 is pushed in, and in Figure 14A, I have illustrated one way in which this may be effected.

Referring to Figure 14A, cam 304a is so designed that it maintains band 271 engaged with gear 118 when knob 313 is disposed in its intermediate and inner positions. Cam 304a is shown in the position it takes when knob 313 is disposed in its intermediate position. Movement of knob 313 from its intermediate into its inner position brings a different portion of cam face 314 into contact with lever 301, but in view of the fact that face 314 is part of an arc swung about shaft 305 as an axis, such movement does not rock lever 301, and brake band 271 is accordingly maintained in engagement with the outer face of internal gear 118.

Although I have disclosed, and prefer to utilize a planetary gear mechanism employing an internal gear cooperating with the planets, it is to be understood, that planetary spur gears may be used throughout, (i. e., a spur sun gear, groups of spur planet gears, one gear of each planetary group meshing with a spur type ring gear, and one gear of each planetary group meshing with a spur type driven gear), without departing from the spirit of the present invention, and the appended claims are intended to embrace mechanisms of this character. It is also contemplated that the gears may be designed to provide any ratio desired depending upon the degree of torque multiplication desired, or whether a torque multiplying or speed multiplying effect is required, according to the use to which the mechanism is to be put.

Referring to Figures 15 and 16 of the drawings, I have disclosed a modified primary-secondary clutch organization associated with the transmission mechanism illustrated in Figure 9.

The primary clutch mechanism is exactly similar to that disclosed in co-pending application Serial Number 660,179 filed March 9th, 1933 and reference may be had thereto for a full disclosure of the structure involved.

The primary clutch mechanism is associated with the flywheel and shaft structure illustrated in Figure 9, and briefly stated it consists of an automatic plate 322, a reaction plate 323, centrifugal weights 324, pressure springs 325, and throwout levers 326, the latter being adapted to withdraw the automatic and reaction plates away from the driven member against the influence of springs 325. When the inner ends of levers 326 are disposed in their left-hand position, the mechanism is declutched regardless of whether or not the centrifugal weights have separated the automatic and reaction plates. When the inner ends of levers 326 are disposed in their mid-position, the reaction plate and automatic plates are disposed in automatic position, and clutch operation is effected under these conditions in accordance with the speed of shaft 5 in the same manner as in the primary clutches previously described. Displacement of levers 326 into their right hand position allows springs 325 to urge reaction plate 323 into such position as to cause automatic plate 322 to grip driven member 17 between it and the flywheel face and accordingly produce clutch engagement regardless of the speed of shaft 5. Actuation of levers 326 in this manner is effected by the following mechanism.

In this form of the invention, hub 161a of the secondary clutch is splined directly to shaft 11 and rotatably mounted upon a sleeve splined to shaft 11, is a sleeve-like support 328, to which ball thrust-bearing assemblies 329 and 331 are secured in any suitable manner. The face of bearing assembly 329 is adapted to cooperate with levers 326, and in Figure 15 is shown as holding the latter in automatic position. Bearing assembly 331 is adapted to cooperate with levers 332 that are secured to weights 165a of the secondary clutch mechanism by cap screws 333 or the like. The secondary clutch is illustrated as disengaged in Figure 9, and bearing assembly 331; in being spaced from levers 332 accordingly allows weights 165a to fulcrum outwardly in response to rotation of member 143a, and produce clutch engagement in the manner previously described.

Sleeve 328 is preferably capable of assuming three positions, and in Figure 15 it is shown in its extreme left-hand position. Under these conditions bearing assembly 329 holds levers 326 in their automatic positions. Another position adapted to be taken by sleeve 328 is to the right of, and with bearing assembly 331 in contact with levers 332 when the latter are in the positions shown in Figure 15. The primary clutch is manually engaged under these conditions and the secondary clutch is manually disengaged, or inhibited from automatically engaging in response to rotation of member 143a. The third position taken by sleeve 328 is intermediate the right and left hand positions and under these conditions the primary clutch is manually engaged, and bearing assembly 331 is spaced sufficiently from levers 332 to permit engagement of the secondary clutch to be effected in response to centrifugal force.

When the secondary clutch is engaged and sleeve 328 is moved into its right-hand position, bearing assembly 331 engages levers 332 and draws weights 165a inwardly to their neutral positions against the influence of centrifugal force, and thereby produces disengagement of the secondary clutch. In view of the fact that the secondary clutch is essentially of the cone type, its engaging pressure is comparatively low with respect to that of the primary clutch, and weights 165a may accordingly be of small mass. The centrifugal force developed in weights 165a therefore is not excessive at normal operating speeds and they may accordingly be manually operated without difficulty. It is to be understood, however, that if desired, the secondary clutch, or its declutching mechanism, may take the form of that embodied in the primary clutch, wherein the declutching operation does not involve retraction of the automatic weights 324, but merely effects retraction of the automatic and reaction plates against the action of springs 325.

It should be observed, that when sleeve 328 is disposed in its right hand position, for effecting disengagement of the secondary clutch, or for inhibiting its automatic engagement in response to rotation of member 143a, bearing assembly 329 is shifted to allow manual engagement of the primary clutch. This is not a disadvantage because when it is desired to manually declutch the secondary clutch mechanism, the primary clutch mechanism usually has already been automatically engaged through the action of weights 324 and levers 326 accordingly retracted away from the face of bearing assembly 329.

Sleeve 328 is provided with an annular groove 335, with which a fork 336 cooperates for shifting sleeve 328 axially upon shaft 11. Fork 336 is provided with fingers that are received in groove 335, and is secured to a shaft 337 that is journalled in housing 1.

Secured to shaft 337, exteriorly of the housing, is a lever 338, that is pivotally connected to a tension and compression link 339. Link 339 is connected to an arm 341 formed on a lever 342, and the latter is mounted for oscillation on a shaft 343 that is carried by housing 1 or any suitable stationary support. A sector 344 is secured to housing 1 and is operably associated with a detent 345 slidably mounted on lever 342. Sector 344 is provided with notches 346, 347, and 348 with which detent 345 is adapted to engage, and in Figure 16, detent 345 is shown engaged with notch 346, thus holding sleeve 328 in automatic position against the action of springs 325, through the medium of lever 341, link 339, lever 338 and fork 336.

Lever 342 also carries an arm 349 having a pin secured thereto that is engaged in a slotted clevis 351. Secured to clevis 351, and pivoted to a bell crank lever 352 is a link 353. Bell crank 352 is pivotally supported in any suitable manner and is connected to a link 354 that is pivoted to a lever 355 secured to cam-shaft 277.

Detent 345 may be operated in any well known manner to withdraw it from the particular notch in sector 344 with which it is engaged, and when it is withdrawn, lever 342 may be foot or hand-operated to dispose detent 345 in any of notches in sector 344.

When lever 342 is moved to dispose detent 345 in notch 347, sleeve 328 is moved into its intermediate position to produce manual engagement of the primary clutch if the latter has not been already engaged through operation of weights 324. This movement of lever 342 causes arm 349 to take up the lost-motion in clevis 351, but preferably does not produce movement of the latter at this time.

When lever 342 is operated so as to dispose detent 345 in notch 348, sleeve 328 is moved to bring bearing assembly 331 into cooperating relationship with levers 332 so as to produce disengagement of the secondary clutch mechanism if the latter is engaged at the time. Movement of lever 342 in this manner, through link 353, bell crank 352, link 354, and lever 355 causes oscillation of cam shaft 277. Oscillation of cam shaft 277 brings cam face 276 into contact with brake band 271 and allows the latter to contract and exert a braking influence upon internal gear 118. Reverse movement of lever 342 restores sleeve 328 to its intermediate or left hand position, and allows a spring 357, secured to bell crank 352, to restore the linkage to its normal position and retract or expand brake band 271.

In view of the fact that the prime mover may be disconnected from the load at any time by disposing shaft 137a in its neutral position, it is not necessary, for motor vehicle operation, to provide mechanism for manually declutching the primary clutch. It is to be understood however, that if it should be desirable, in the particular drive involved, to manually disengage the primary clutch, lever 342 may be moved to an extreme left hand position, with detent 345 to the left of notch 346 for moving bearing assembly 329 into declutching cooperation with levers 326. During the following detailed description of the operation of this mechanism, however, the extreme left hand position just mentioned will not be considered.

With the parts disposed in the positions they assume in Figures 15 and 16, the low speed or torque multiplying drive, the automatic transition from torque multiplying drive to direct drive, manual disconnection of the driving and driven shafts, and reverse drive are effected in the manner described in detail in connection with the first embodiments of my invention.

When it is desired to obtain a permanent torque multiplying drive, for handling heavy drive and coast loads, as in ascending or descending long steep grades respectively, lever 342 is moved to dispose detent 345 in notch 348. This operation disengages the secondary clutch and prevents it from being automatically re-engaged in response to centrifugal force, and also brings internal gear 118 to rest. In view of the fact that the secondary clutch may be readily engaged and disengaged regardless of whether a coast or drive load is imposed thereon, and the arresting mechanism for internal gear 118 is a friction brake mechanism, this operation may be rapidly effected regardless of the relative speeds of the engaging parts, and renders the power transmitting mechanism extremely flexible in operation.

If it is desired to effect a forward drive between shafts 5 and 103 when the prime mover is operating substantially below the engaging speed of the primary clutch, or is stationary, lever 342 is moved so as to dispose detent 345 in notch 347. This operation disposes sleeve 328 in its intermediate position, allowing levers 326 to move into manually engaged position. The primary clutch is now manually engaged, and forward or clockwise rotation of shafts 5 and 11 establishes a torque multiplying drive through pinion 101 and planet gears 99 in the manner previously described.

When lever 342 is disposed in its intermediate position, and it is desired to turn the engine over by towing or coasting the vehicle, internal gear 118 over-runs in response to such towing or coasting operation without transmitting cranking effort to the engine, until the vehicle is accelerated sufficiently to bring member 143a up to a speed corresponding to the engaging speed of the secondary clutch mechanism. When this speed is attained, the secondary clutch automatically engages and smoothly transmits torque from shaft 103 to shaft 11, and through the latter to the engine or other prime mover.

On the other hand, if it is desired to transmit torque from shaft 103 to shaft 11 without accelerating shaft 103 sufficiently to cause the secondary clutch to engage, lever 342 may be moved to dispose detent 345 in notch 348. This operation produces manual engagement of the primary clutch, and at the same time restrains internal gear 118 against rotation. When the vehicle is towed or coasted under these conditions, torque is transmitted from shaft 103 through planet gears 99 and pinion 101 to shaft 11, and from shaft 11 through the manually engaged primary clutch to shaft 5.

It is to be understood that this primary and secondary clutch organization may be employed in the embodiments of my invention that have been previously described, and the primary and secondary clutch mechanisms may be provided with independent throwout mechanisms if desired.

As described in connection with the mechanism illustrated in Figure 1 of the drawings, in practice, the secondary automatic clutch mechanisms disclosed in Figures 9 and 15 of the drawings, are preferably so designed that complete clutch engagement is relatively rapid, so that the entire engaging operation, terminating in full engagement, takes place over a speed range of approximately ten to twelve percent or less, or approximately one-tenth of the speed range in which slipping drive conditions exist in the respective primary clutch mechanisms. Thus the opportunity for undesirably prolonged slipping during load conditions under which the secondary clutch is in slipping drive engagement as might occur in practice, is reduced to a minimum. The chief requisite in any case is that the transition period, during which there is a virtually decreasing torque multiplication between the time that the secondary clutch starts to take hold and the time that it is fully engaged without any slip, must be sufficiently prolonged to permit smooth changes from low gear to direct drive, and vice versa. The smoothness of this change is made possible by the differentiating action of the gear and pinion mechanism during the transition period. Accordingly, the range of figures just given are approximate, and apply particularly to the disclosed mechanisms, which are designed for use in motor vehicles of the pleasure car class. It will be readily appreciated, that in heavy duty industrial or like drives, the above given slippage figures may be varied by properly designing the weights and hold-back springs of the secondary clutch mechanisms to meet the requirements of the particular installation involved.

The invention may be embodied in other specific forms without departing from the spirit or essential characteristics thereof. The present embodiments are therefore to be considered in all respects as illustrative and not restrictive, the scope of the invention being indicated by the appended claims, rather than by the foregoing description, and all changes which come within the meaning and range of equivalency of the claims are therefore intended to be embraced therein.

What is claimed and desired to be secured by United States Letters Patent is:—

1. In an automatic power transmitting mechanism, driving and driven members and an intermediate member; a primary automatic clutch, and a secondary automatic clutch operably associated with said members; and common means for manually disengaging either of said clutches and for manually engaging said primary clutch independently of its normal automatic engaging operation, whereby driving efforts may be transmitted from said driving member to said intermediate and driven members at will.

2. In a power transmitting mechanism, relatively rotatable driving and driven members; means for transmitting power between said members, comprising a planet assembly and an orbital gear mounted for relative rotation; means for holding said orbital gear against rotation in one direction when said planet assembly is driving said driven member, said means being mounted for rocking movement substantially in a plane parallel to the axis of the mechanism, and operable to release said orbital gear for two-directional rotation.

3. The mechanism defined in claim 2, wherein said last-named means is operable to restrain said planet assembly against rotation when it is rocked.

4. The mechanism set forth in claim 2, wherein said last-named means is operable to establish a driving connection between said orbital gear and said driven member when it is rocked.

5. In a power transmitting mechanism, in subcombination, a rotatable element adapted to have the reactive forces of a planetary gear system applied thereto; a reaction member operably associated with said element and mounted for rotation; means for releasably holding said reaction member against rotation in at least one direction; and means for coupling said element to said reaction member when said element tends to rotate in said direction.

6. The mechanism described in claim 5, wherein said element and said reaction member are mounted for rotation about a common axis.

7. The mechanism set forth in claim 5, wherein said first-named means is operable to restrain said reaction member against rotation in both directions.

8. The mechanism described in claim 5, wherein said last-named means comprises wedge devices which are disposed between, and are adapted to cooperate with surface portions of said element and said reaction member.

9. In a power transmitting mechanism, a planet assembly and an orbital gear mounted for relative rotation about a common axis and having axially spaced portions; and means, including a lever device, mounted for rocking movement about an axis transverse to the axis of the mechanism, for locking said planet assembly against rotation when said lever device is rocked in one direction, and for restraining said orbital gear against rotation when it is rocked in another direction.

10. The mechanism described in claim 9, wherein said lever device is adapted to cooperate with teeth provided on a part of said planet assembly.

11. In a power transmitting mechanism, a driving member; a driven member; a device for establishing a torque multiplying power transmitting connection between said members, including an element adapted to rotate when the device is transmitting power between said members; means, comprising an automatic friction clutch, for establishing a direct drive between said members when said element attains a predetermined speed; and reverse drive establishing means for restraining said element against rotation in at least one direction and for causing said device to transmit retrograde driving efforts to said driven member, whereby said direct drive establishing means is inoperative as said automatic clutch does not tend to engage when said device is operating in reverse drive.

12. The mechanism described in claim 11, wherein said reverse drive establishing means is adapted to restrain said element against rotation in both directions.

13. In a power transmitting mechanism, a driving member; a driven member; means for automatically coupling said members when said driving member attains a predetermined speed; and means for establishing a driving connection between said members independently of the action of said automatic coupling means, said last-named means being ineffective to transmit driving forces from the driving to the driven member.

14. In a power transmitting mechanism, a driving member; a driven member; means for automatically coupling said members when said driving member attains a predetermined speed; and means for establishing a driving connection between said members independently of the action of said automatic coupling means, said last-named means being ineffective to transmit power from the driving to the driven member; and being operable to automatically uncouple said members when the driving member tends to drive the driven members.

15. In a power transmitting mechanism, a housing; a pair of spaced, aligned bearings disposed in said housing; a planet carrier assembly having a hub portion journaled in one of said bearings; an orbital gear operably associated with said carrier and having an axially extending hub portion journaled in said other bearing; and at least one shaft disposed within the hub portion of said gear and operably coupled to a part of said planet gear assembly, said planet carrier assembly comprising a supporting member having planet gears meshing with said orbital gear; and means for coupling said shaft to said planet carrier assembly.

16. In a power transmitting mechanism, driving and driven members; an orbital gear operably associated with said members and having an axially extending hub; a planet assembly adapted to transmit power between said members and apply reactive forces to said orbital gear; means adapted to apply forces to said orbital gear hub, for restraining said orbital gear against rotation in one direction in response to application of reactive forces thereto, said means being selectively operable to allow said orbital gear to rotate in both directions; and means for causing said planet assembly and said orbital gear to transmit retrograde driving efforts from said driving member to said driven member when said orbital gear is free for two directional rotation, said last-named means including a clutch member splined to said driven member and having teeth adapted to mesh with teeth formed on the interior of the hub of said orbital gear.

17. In a power transmitting mechanism, a rotatably supported shaft; a rotatably supported planet gear mechanism coaxially disposed with respect to said shaft and having an axially extending hub, the outer surface of said hub being supported in a pair of axially spaced bearings; a gear assembly aligned with said shaft and adapted to cause reactive forces to be applied to said planet gear mechanism, and means, associated with the hub of said planet gear mechanism, for opposing the reactive forces applied thereto, comprising a plurality of overrunning clutch rollers, which are adapted to cooperate in line contact with the outer surface of said hub.

18. In a power transmitting mechanism, driving and driven members; an orbital gear operably associated with said members and having a single axially extending hollow hub disposed to one side thereof; a planet assembly adapted to transmit power between said members and apply reactive forces to said orbital gear; means, adapted to apply forces to the external surface of said orbital gear hub, for restraining said orbital gear against rotation in one direction in response to application of reactive forces thereto, said means being selectively operable to allow said orbital gear to rotate in both directions; and means for causing said planet assembly and said orbital gear to transmit retrograde driving efforts from said driving member to said driven member when said orbital gear is free for two-directional rotation, said last-named means including means for coupling said orbital gear hub to said driven member, said last-named means also comprising a clutch disposed within, and operable to exert forces against the internal surface of said hub.

19. In an automatic transmission, a driving member, an intermediate member and a driven member disposed in series and adapted to transmit power from a prime mover to a load; a primary automatic clutch operable to automatically couple said driving and intermediate members when said driving member attains a predetermined speed; a torque multiplying mechanism normally interconnecting said intermediate and driven members; means for automatically establishing a direct drive between said intermediate and driven members when certain conditions have been attained in the transmission, comprising a secondary automatic clutch; said primary and secondary clutches being disposed in spaced axial alignment; and means, disposed between said clutches and mounted for axial movement, for disengaging at least one of said clutches.

20. The mechanism described in claim 19, wherein said last-named means comprises a single operating device which is operable when it is in one position to disengage said primary clutch and when in another position it is operable to disengage said secondary clutch.

21. The mechanism set forth in claim 19, wherein said last-named means comprises a device movable in one direction to disengage one of said clutches and movable in an opposite direction to disengage the other of said clutches.

22. The mechanism described in claim 19, wherein said last-named means is adapted to assume a primary clutch disengaging position, a primary clutch engaging position, and a secondary clutch disengaging position.

23. In an automatic power transmitting mechanism, driving and driven members, a torque multiplying mechanism having a primary automatic friction clutch for establishing a torque multiplying connection between said members when said driving member attains a predetermined speed, said clutch having plane frictional surfaces that are disposed substantially normal to the axis of the mechanism; and a secondary automatic clutch for automatically establishing a direct drive between said members when certain conditions have been attained in the mechanism, said secondary automatic clutch having frictional surfaces of cone-shaped configuration, whereby said secondary automatic clutch possesses an inherently smaller period of slip than said primary automatic clutch.

24. In an automatic power transmitting mechanism, driving and driven members; means for establishing a one-way, torque multiplying connection between said member when said driving member attains a predetermined speed, comprising a centrifugally operable clutch and a gear assembly, said clutch having resilient means tending to engage it, and having means for holding it disengaged against the action of said resilient means when said driving member is operating at a predetermined idling speed, said holding means being releasable to allow said resilient means to engage the clutch; and controlling means, connected to said holding means and operable therewith, for rendering the torque multiplying connection two-way in character when said holding means is released.

25. The mechanism described in claim 24, wherein said controlling means is operable to apply a braking influence to a part of said gear assembly when said holding means is released.

26. The mechanism described in claim 24, wherein said controlling means is operable to assume an intermediate condition wherein the clutch is engaged under the influence of said resilient means, and the torque multiplying connection between the driving and driven members is one-way in character.

27. In an automatic power transmitting mechanism, in sub-combination, a driving shaft and a driven shaft; a normally disengaged automatic clutch associated with said shafts and operable to transmit power therebetween when it is engaged; said automatic clutch having a cover providing teeth adjacent said driven shaft; centrifugally operable means for engaging said clutch when said driving member attains a predetermined speed, and means, comprising a jaw clutch member splined to said driven shaft and adapted to mesh with the teeth on said clutch cover for establishing a driving connection between said shafts when said automatic clutch is disengaged.

28. In an automatic power transmitting mechanism, a driving member, an intermediate member and a driven member mounted for relative rotation; a primary automatic clutch for transmitting power between said driving and intermediate members; a secondary automatic clutch and a gear assembly for transmitting power between said intermediate and driven members, and a clutch device disposed between said clutches and operable to selectively couple said driving member or a part of said secondary automatic clutch to said intermediate member.

29. The mechanism described in claim 28, together with means for applying a braking influence to a part of said gear assembly when said clutch device is uncoupled from said secondary clutch part.

30. The mechanism described in claim 28, together with means for automatically applying a braking influence to a part of said gear assembly when said clutch device is coupled to said driving member.

31. The mechanism described in claim 28, wherein said clutch device comprises a jaw clutch splined to said intermediate member and is operable to assume an intermediate position wherein it is uncoupled from said driving member and said secondary automatic clutch part.

32. In an automatic power transmitting mechanism, in sub-combination a cylindrical member having a smooth outer surface and mounted for rotation, said member being operable to have the reactive forces of a gear assembly applied thereto, a ring spaced from the outer surface of said member and mounted for rotation with respect thereto, a plurality of overunning clutch rollers disposed between said member and said ring for preventing said member from rotating in one direction with respect to said ring; and a latch device for releasably locking said ring against rotation.

33. The mechanism described in claim 32, wherein said latch device comprises an element mounted for movement into and out of engagement with teeth provided on said ring.

34. In a power transmitting mechanism, a driving member, a driven member; a device for establishing a torque multiplying power transmitting connection between said members, including an element adapted to rotate when certain power transmitting conditions exist in the mechanism; means comprising a speed responsive friction clutch for establishing a direct drive between said members when said element attains a predetermined speed; and reverse drive establishing means for causing said driving member to transmit retrograde driving efforts to said driven member, and means, actuated by said reverse drive establishing means, for automatically restraining said element against rotation in at least one direction, whereby said direct drive establishing means is inoperative in reverse drive, as said speed responsive clutch does not tend to engage under such conditions.

35. The power transmitting mechanism described in claim 34, wherein said reverse drive establishing means is operable to restrain said element against rotation in both directions.

36. In an automatic transmission, a driving member, an intermediate member and a driven member disposed in series and adapted to transmit power from a prime mover to a load; a primary automatic clutch operable to automatically couple said driving and intermediate members when said driving member attains a predetermined speed; a torque multiplying mechanism normally interconnecting said intermediate and driven members and providing a one-way power transmitting connection therebetween; means for automatically establishing a direct drive between said intermediate and driven members when certain conditions have been attained in the transmission, comprising a secondary automatic clutch, said primary and secondary clutches being disposed in spaced axial alignment; declutching means disposed between said clutches and mounted for axial movement for disengaging said primary clutch when moved in one direction and for disengaging said secondary clutch when moved in the opposite direction; two-way drive establishing means for rendering said torque multiplying mechanism capable of transmitting power in both directions when said declutching means is moved in said opposite direction to disengage said secondary clutch, comprising coupling means interconnecting it with said declutching means, said coupling means being operable to allow said declutching means to move in said one direction to disengage said primary clutch without interference from said two-way drive establishing means.

JOSEPH E. PADGETT.